United States Patent
Ström et al.

(10) Patent No.: US 12,219,133 B2
(45) Date of Patent: Feb. 4, 2025

(54) BILATERAL LOOP FILTER

(71) Applicant: Telefonaktiebolaget LM Ericsson (publ), Stockholm (SE)

(72) Inventors: Jacob Ström, Stockholm (SE); Per Wennersten, Årsta (SE); Jack Enhorn, Kista (SE); Ruoyang Yu, Täby (SE); Lukasz Litwic, Gdansk (PL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/438,366

(22) PCT Filed: Mar. 10, 2020

(86) PCT No.: PCT/EP2020/056367
§ 371 (c)(1),
(2) Date: Sep. 10, 2021

(87) PCT Pub. No.: WO2020/182819
PCT Pub. Date: Sep. 17, 2020

(65) Prior Publication Data
US 2024/0414331 A1    Dec. 12, 2024

Related U.S. Application Data

(60) Provisional application No. 62/896,132, filed on Sep. 5, 2019, provisional application No. 62/882,111, filed
(Continued)

(51) Int. Cl.
*H04N 7/12* (2006.01)
*H04N 19/117* (2014.01)
(Continued)

(52) U.S. Cl.
CPC ......... *H04N 19/117* (2014.11); *H04N 19/124* (2014.11); *H04N 19/132* (2014.11);
(Continued)

(58) Field of Classification Search
CPC .. H04N 19/117; H04N 19/124; H04N 19/132; H04N 19/167; H04N 19/176; H04N 19/80
See application file for complete search history.

(56) References Cited

U.S. PATENT DOCUMENTS 6,154,487 A * 11/2000 Murai ................ H04B 1/70757
375/150
10,904,568 B2 * 1/2021 Lee ....................... H04N 19/176
(Continued)

OTHER PUBLICATIONS

International Search Report for International Application No. PCT/EP2020/056367 dated May 28, 2020, 18 pages.
(Continued)

*Primary Examiner* — Gims S Philippe
(74) *Attorney, Agent, or Firm* — Sage Patent Group

(57) ABSTRACT

Methods, decoders, and programs are provided. All blocks of an image that has been encoded are decoded. At least one sample of at least one block of the image is filtered by, for each block being filtered: for each sample being filtered: selecting a plurality of neighboring samples. For at least one neighboring sample, a difference is calculated between the neighboring sample and the sample. A modifier value is obtained. A modifier sum is derived based on a sum of the modifier values for the neighboring samples. A correction value is determined based on a conditional addition of at least one shifted version of the modifier sum, each shift having a same number of shift steps in each correction value determination. A filtered sample is derived based on the sample and correction value. The filtered sample is stored. The block and filtered sample is output towards a decoder output.

17 Claims, 8 Drawing Sheets

Related U.S. Application Data on Aug. 2, 2019, provisional application No. 62/816,365, filed on Mar. 11, 2019.

(51) Int. Cl.
  *H04N 19/124* (2014.01)
  *H04N 19/132* (2014.01)
  *H04N 19/167* (2014.01)
  *H04N 19/176* (2014.01)
  *H04N 19/80* (2014.01)

(52) U.S. Cl.
  CPC ......... *H04N 19/167* (2014.11); *H04N 19/176* (2014.11); *H04N 19/80* (2014.11)

(56) References Cited

U.S. PATENT DOCUMENTS

2019/0052875 A1* 2/2019 Son .................. H04N 19/85
2019/0304069 A1* 10/2019 Vogels ............... G06N 20/00

OTHER PUBLICATIONS

International Preliminary Report on Patentability for International Application No. PCT/EP2020/056367 dated Aug. 25, 2021, 11 pages.
Ström et al., "Reduced Complexity Bilateral Filter", JVET-K0274, Powerpoint, Jul. 9, 2018, 55 pages.
Ström et al., AHG 2 related: Reduced complexity bilateral filter, Joint Video Experts Team (JVET)of ITU-T SG 16 WP 3 and ISO/IEC JTC 1/SC 29/WG 11 11th Meeting: Ljubljana, SI, Jul. 10-18, 2018, JVET-K0274-v1, 9 pages.
Strom (Ericsson) J et al: 11 CE2 related: Reduced complexity bilateral filter 11, 11. JVET Meeting; Jul. 11, 2018-Jul. 18, 2018; Ljubljana; (The Joint Video Exploration Team of ISO/IEC JTC1/SC29/WG11 and ITU-T SG.16), JVET-K0274 v4, Jul. 16, 2018, XP030199943, 13 pages.
JVET-K0274 (accompanying Data) BMS Results, Jul. 9, 2018, 105 pages.
JVET-K0274 (accompanying Data) VTM Results, Jul. 9, 2018, 105 pages.
Said et al., "CE5: Binary Arithmetic Coding Range Update with Small Table or Short Multiplications (test B1)", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0383-v2, 9 pages.
JVET-K0383 (accompanying Data) VTM + Table 16x16x8, Jul. 10, 2018, 99 pages.
JVET-K0383 (accompanying Data) BMS + Table 8x8x8, Jul. 10, 2018, 99 pages.
JVET-K0383 (accompanying Data) BMS + Table 16x16x8, Jul. 10, 2018, 99 pages.
JVET-K0383 (accompanying Data) Table 8x8 vs Engine-1, Jul. 10, 2018, 113 pages.
JVET-K0383 (accompanying Data) Table 16x16 vs Engine-1, Jul. 10, 2018, 113 pages.
JVET-K0383 (accompanying Data) VTM + Table 8x8x8, Jul. 10, 2018, 99 pages.
Ström et al., "CE14: Reduced latency, LUT-free bilateral filter", Joint Video Experts Team (JVET) of ITU-T SG 16 WP 3 and ISO/IEC JTC 1/SC 29/WG 11, 12th Meeting: Macao, CN, Oct. 3-12, 2018, JVET-L0172_v2, XP030193992, 15 pages.
JVET-L0172 (accompanying Data) Result BMS201 VTMconfig CE14.1a, Oct. 3, 2018, 95 pages.
JVET-L0172 (accompanying Data) Result BMS201 VTMconfig CE14.1b, Oct. 3, 2018, 117 pages.
JVET-L0172 (accompanying Data) Result BMS201 VTMconfig CE14.1c, Oct. 3, 2018, 95 pages.
Ikonin et al., "Non-CE: Hadamard transform domain filter", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0468, 7 pages.
JVET-M0468 (accompanying Data) VTM 3.0 vs VTM 3.0 HTDF Test 1, Jan. 9, 2019, 64 pages.
JVET-M0468 (accompanying Data) VTM 3.0 vs VTM 3.0 HTDF Test 2, Jan. 9, 2019, 62 pages.
JVET-M0468 (accompanying Data) VTM 3.0 vs VTM 3.0 HTDF Test 3, Jan. 9, 2019, 66 pages.
Stroöm, "Non-CE: Reduced complexity bilateral filtering", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0885_v2, 3 pages.
Stroöm, "Non-CE: Reduced complexity bilateral filtering", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0885_v3, 3 pages.
Stroöm, "Non-CE: Reduced complexity bilateral filtering", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0885_v4, 3 pages.
JVET-M0885 (accompanying Data) result test 1, Jan. 9, 2019, 96 pages.
JVET-M0885 (accompanying Data) result test 2 v2, Jan. 9, 2019, 91 pages.
JVET-M0885 (accompanying Data) result test 2 v4, Jan. 9, 2019, 91 pages.
JVET-M0885 (accompanying Data) result test 2 worst case, Jan. 9, 2019, 91 pages.
Bross et al., "Versatile Video Coding (Draft 3)" Joint Video Experts Team (JVET) of ITU-T SG 16 WP 3 and ISO/IEC JTC 1/SC 29/WG 11 12th Meeting: Macao, CN, Oct. 3-12, 2018, JVET-L10011 v9, 236 pages.
Strom (Ericsson) J et al: "CE1-related: Multiplication-free bilateral loop filter", JVET Meeting; Mar. 19-27, 2019, No. JVET-No. 493_V2, XP030204312, 8 pages.
Gadde (Qualcomm) et al., "CE2.1.3: In-Loop Bilateral Filter," 11 JVET Meeting; Jul. 10-18, 2018, Ljubljana (The Joint Video Exploration Team of ISO/IECc JTC1/SC29/WG11 and ITU-T SG.16) No. JVET-K0384 (XP030199470) 5 pages.
JVET-K0384 (accompanying Data), Jul. 10, 2018, 128 pages.
Wennersten, P., et al., "Bilateral Filtering for Video Coding," IEEE VCIP' 17, Dec. 10-13, 2017, St Petersburg, FL, U.S.A., 4 pages.
Ikonin, S., et al., "JVET-M0468 Non CE: Hadamard Transform Domain Filter," (PowerPoint) Building a better connected World (Huawei) 13th Meeting: Marrakech, MA, Jan. 9-18, 2019, 12 pages.

* cited by examiner

|   |   | $I_{AA}$ |   |   |
|---|---|---|---|---|
|   | $I_{NW}$ | $I_A$ | $I_{NE}$ |   |
| $I_{LL}$ | $I_L$ | $I_C$ | $I_R$ | $I_{RR}$ |
|   | $I_{SW}$ | $I_B$ | $I_{SE}$ |   |
|   |   | $I_{BB}$ |   |   |

Figure 4

BILATERAL LOOP FILTER

CROSS REFERENCE TO RELATED APPLICATIONS

This application is a 35 U.S.C. § 371 national stage application of PCT International Application No. PCT/EP2020/056367 filed on Mar. 10, 2020, which in turns claims domestic priority to U.S. Provisional Patent Application No. 62/816,365, filed on Mar. 11, 2019, U.S. Provisional Patent Application No. 62/882,111, filed on Aug. 2, 2019, and U.S. Provisional Patent Application No. 62/896,132, filed on Sep. 5, 2019, the disclosures and content of which are incorporated by reference herein in their entirety.

TECHNICAL FIELD

The present disclosure relates generally to image processing, and more particularly to the coding and decoding of video sequences and/or still image and related methods and device.

BACKGROUND

A video sequence consists of several images. When viewed on a display screen, the image consists of pixels, each pixel having a red, green and blue value (RGB). However, when encoding and decoding a video sequence, the image is often not represented using RGB. Instead, the image is typically represented in another color space, including but not limited to YCbCr, ICTCP, non-constant-luminance YCbCr, and constant luminance YCbCr. For example, YCbCr, is made up of three components, Y, Cb and Cr. It is often the case that Y, which is called luma and which roughly represents luminance, is of full resolution, whereas the two other components, Cb and Cr, called chroma, are of a smaller resolution. A typical example is an HD video sequence containing 1920×1080 RGB pixels, which is often represented with a 1920×1080 resolution Y component, a 960×540 Cb component and a 960×540 Cr component. The elements in the components are called samples. In the example given above, there are 1920×1080 samples in the Y component, and hence a direct relationship between samples and pixels when the Y component is being filtered. In the description that follows, the term pixels and samples may be used interchangeably. For the Cb and Cr components, there is no direct relationship between samples and pixels; a single Cb sample typically influences several pixels.

In many video coding standards, the components Y, Cb and Cr are further partitioned into blocks. As an example, in AVC the image is divided into macroblocks of 16×16 Y samples and 8×8 Cb and Cr samples representing the same 16×16 pixel area.

In HEVC, the image is divided into coding tree units (CTUs). A CTU consists of an N×N block of luma samples and M×M chroma samples for Cb and M×M chroma samples for Cr. An example is to use N=64 and M=32. The CTU can then be split into four square blocks, which can in turn be split into four square blocks, recursively. This thus forms a splitting tree with the CTU as root and square blocks called coding units (CUs) as leaves.

In VVC, the image is divided into coding tree units (CTUs). A CTU consists of an N×N block of luma samples and M×M chroma samples for Cb and M×M chroma samples for Cr. An example may be to use N=128 and M=64. Just as in the case for HEVC, the CTU can then be split into smaller blocks, but these do not have to be squares.

As an example, a block can be split into two smaller blocks using a vertical split where the split blocks have the same width as the original block but half the height. This splitting can go on recursively, forming a splitting tree where the CTU is the root and the blocks at the leaves are called coding units (CUs). These CUs can be further divided into transform units, or TUs. In the decoder, the samples of a TU may first be predicted, either by using samples from a previously decoded block in the same image (intra prediction), or using samples from a block in a previously decoded image (inter prediction), or a combination of the two.

Bilateral filtering of image data directly after forming the reconstructed image block can be beneficial for video compression. The bit rate may be reduced with maintained visual quality using the bilateral filter as described by [1]. The reduction in bit rate is measured in Bjontegaard delta-rate (BD-rate), where a negative BD-rate figure of −1% means that the bit rate has been reduced by 1% while maintaining the same visual quality. For the filter in [1], the BD-rate was −0.5% for a run-time increase of 3% (encode) and 0% (decode) for random access. The run time is the time it takes to encode or decode a sequence. A low run time increase is desirable.

Problems with existing solutions.

Providing a filtering step, such as the bilateral filtering step, right after reconstruction results in the filtering step being placed in the critical path of a difficult part of the decoder. For example, when an image consists of only intra blocks, all the TUs or CUs are of the intra type. The currently decoded block may use samples from a neighboring intra block for prediction. As a result, the neighboring block must be fully decoded before the current block can be processed. For a single-threaded software decoder the serial decoding of the neighboring block before the current block can be processed does not matter in terms of decoding time. However, for a hardware implementation where results are typically computed in parallel when possible, this serial decoding is a disadvantage. Adding a filtering step here makes this situation worse since an even longer time may be required to obtain the samples of the neighboring block necessary to decode the current block.

One possible way has been shown to avoid this problem by avoiding the filtering of intra blocks, for instance in JVET-K0274 as noted by J. Ström, "Non-CE: Reduced complexity bilateral filter", JVET-M0885, 13th JVET Meeting, Marrakech, Marocco, 9-18 Jan. 2019. However, this avoidance of filtering intra blocks impacts performance. In J. Ström, "Non-CE: Reduced complexity bilateral filter", JVET-M0885, 13th JVET Meeting, Marrakech, Marocco, 9-18 Jan. 2019, for example, the BD-rate is worse, −0.41%, but −0.41% still provides a gain. However, problems remain even though filtering of intra blocks are avoided. One reason for the problems that remain is that inter blocks are still filtered. The bilateral filtering of an inter block may involve using samples from a neighboring block. If the neighboring block is an intra block, the inter block cannot be decoded until the intra block has been decoded. This decoding dependency is undesirable. A decision was made at the JVET meeting at Marrakech meeting where [2] was presented to investigate what happens to the BD-rate when inter blocks are not allowed to use any samples from neighboring blocks. The investigation determined that not allowing inter block to use any samples from neighboring blocks significantly lowers the BD-rate performance.

Another approach may be to only allow the use of neighboring samples from other inter blocks (i.e., not from intra blocks). Although this approach helps BD-rate performance, it is not as efficient as always allowing the use of samples from neighboring blocks. Also, having to check whether taking samples from a neighboring block is allowed (i.e., checking whether the neighboring block is an inter block) is computationally expensive. For example, a block of size 16×16 samples may be neighboring four 4×4 blocks above and four 4×4 blocks to the left. Each of these blocks must be checked whether the blocks are inter blocks, i.e., there are eight checks. The checking makes the decoding more complex and more computationally expensive.

Another shortcoming with previous methods is that they may rely on non-local filtering as described in Section 4 in JVET-L0274 [3]. The non-local filtering involves calculating a number of absolute differences between sample values and averaging of the differences. These calculations and averaging add at least one additional step. The additional step(s) may significantly increase the number of latency cycles in a hardware implementation. For example, the use of non-local filtering may increase the latency from two cycles to three cycles. This is problematic given that the clock cycle count may already be strained.

Furthermore, many previous variants of bilateral filtering have either used long look-up tables (LUTs) or used multiplications. Long per-pixel look-up tables are problematic for software implementations since efficient SIMD-code can only be made for look-up tables of size 16 or smaller. Long LUTs are also problematic for hardware implementations since all of the coefficients require silicon surface area. Since a hardware implementation may need to filter two, four or even eight samples in parallel, even a small look-up table can use up a significant amount of costly surface area since there are two, four or eight instantiations of the LUT on the same chip. Furthermore, often a single sample needs two or four look-ups meaning that a worst case number of coefficients needed to be stored can be 8*4=32 times larger than just that of a single LUT.

SUMMARY

Given all the drawbacks described above, one can question whether the bit rate reduction is worth the complexity needed to perform the filtering for the above-described approaches of the bilateral filter. These drawbacks and complexity also apply to other filters, such as the Hadamard filter presented in JVET-M0468 [4].

According to some embodiments of inventive concepts, a method is provided that is performed by a decoder. The method includes decoding all blocks of an image that has been encoded. The method further includes filtering at least one sample of at least one block of the image by, for each block being filtered: for each sample being filtered of the at least one sample: selecting a plurality of neighboring samples of the sample being filtered. The method further includes for at least one neighboring sample of the plurality of neighboring samples: calculating a difference between the neighboring sample and the sample being filtered and obtaining a modifier value based on the difference. The method further includes deriving a modifier sum based on a sum of the modifier values for the plurality of neighboring samples. The method further includes determining a correction value based on a conditional addition of at least one shifted version of the modifier sum, where each shift of the at least one shifted version has a same number of shift steps in each determination of the correction value. The method further includes deriving a filtered sample based on the sample to be filtered and the correction value. The method further includes storing the filtered sample. The method further includes outputting the at least one block with the filtered sample towards an output of the decoder.

According to further embodiments of inventive concepts, a decoder apparatus and computer program are provided that perform similar operations as described in the above embodiments of inventive concepts.

Some potential advantages of the inventive concepts described herein include that bilateral filter described herein may be placed as a loop filter, i.e., at the same level as, e.g., a deblocking filter. This location at the same level avoids the issues of the filter being in the critical path of either intra blocks or inter blocks since all the intra blocks and inter blocks have already been decoded when the loop-filter is applied. Since all intra blocks and inter blocks have been decoded, the bilateral filter may access samples from neighboring blocks when filtering the image, regardless of the block type of the neighboring filter. Hence expensive and cumbersome tests are not required to be performed to figure out if the neighboring block is of the right type and whether the bilateral filter is allowed to use samples from the neighboring block.

Additionally, since all samples have been decoded, samples may be used not only from blocks to the left and above the current block, but also from blocks to the right and below the current block. The use of these blocks may increase the BD-rate performance of the decoding method used. The placement of the bilateral filter also avoids the non-local filtering step previously described. Thus, the extra latency associated with the non-local filtering step may be avoided. Furthermore, by avoiding this step, tables such as look-up tables may be used where the multiplication has already been pre-calculated and folded into the table. Hence, no expensive multiplications are needed.

Also, since these table values may be arbitrarily set, the inventive concepts are not constrained to one that implements a bilateral filter. For example, negative items may be used in the table to further increase BD-rate performance. Moreover, by reducing the table size to 16 items, it is possible to efficiently implement the method using single instruction multiple data (SIMD) code.

Diagonal samples may also be used in the filtering. The filtering of diagonal samples may further increase the BD-rate performance. Thus, the multiplication-free filter that does not sit in the critical path of the decoder may lead to a higher BD-rate performance and may be implementable using SIMD code.

According to some additional embodiments of inventive concepts, a method performed by a decoder, a decoder apparatus, a decoder, and a computer program are provided to perform operations including decoding all blocks of an image that has been encoded. The operations further include filtering at least one sample of at least one block of the image by, for each block being filtered: obtaining a strength factor based on at least one of a type of the block being filtered and a size of the block being filtered. The operations further include for each sample being filtered of the at least one sample: selecting a plurality of neighboring samples of the sample being filtered. The operations further include for at least one neighboring sample of the plurality of neighboring samples: calculating a difference between the neighboring sample and the sample being filtered, and obtaining a modifier value based on the difference. The operations further include deriving a modifier sum based on a sum of the modifier values for the plurality of neighboring samples. The operations further include determining a correction value based on a multiplication using the strength factor and the modifier sum. The operations further include deriving a filtered sample based on the sample to be filtered and the correction value. The operations further include storing the filtered sample. The operations further include outputting the at least one block with the filtered sample towards an output of the decoder.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 4 is a block diagram illustrating a sample and neighboring samples and a representation of intensities according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
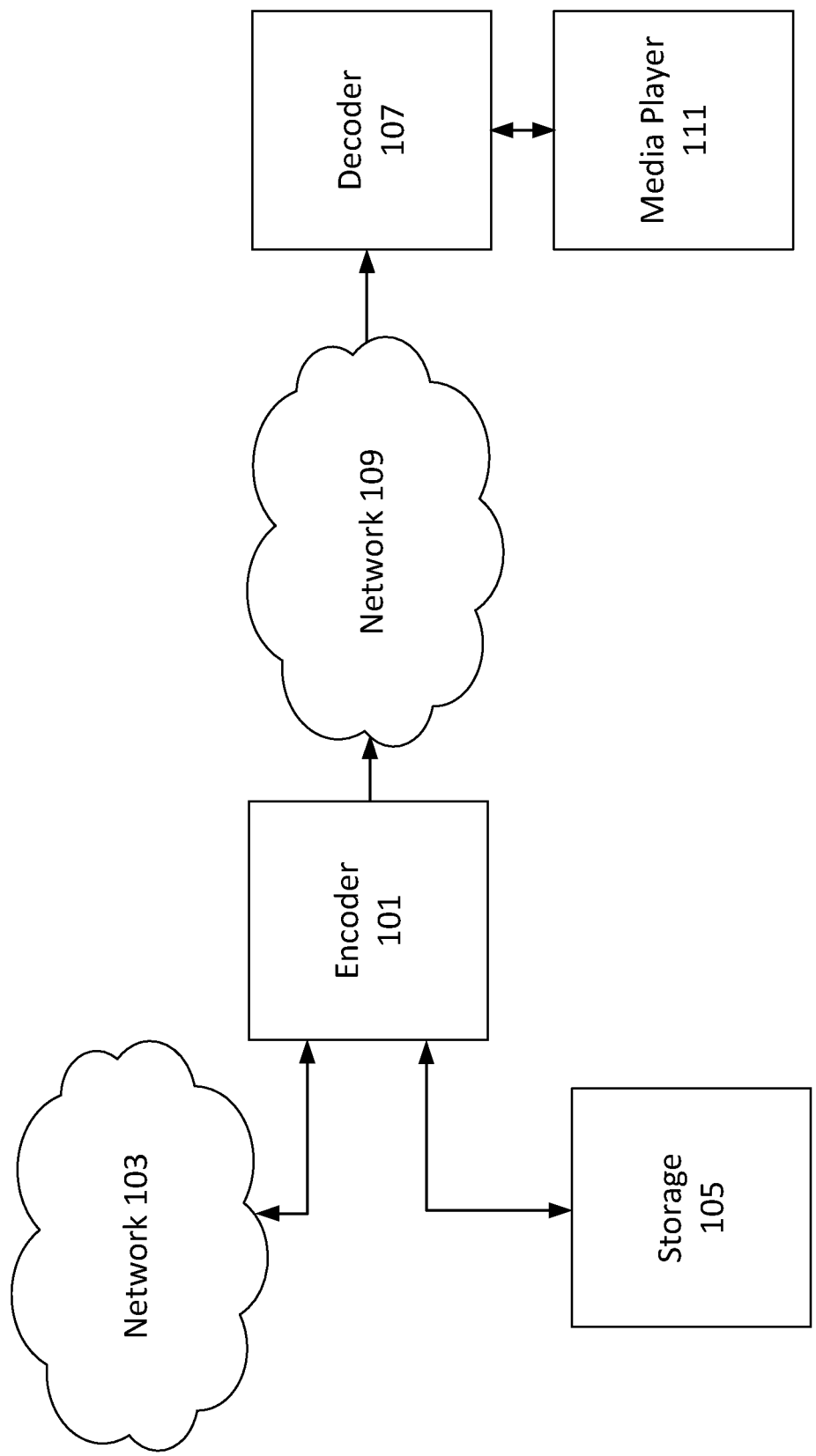
FIG. 1 is a block diagram illustrating an example of an environment of a system in which the decoder may be implemented according to some embodiments of inventive concepts.

FIG. 1 illustrates an example of an operating environment of a decoder 107 that may be used to decode bitstreams as described herein. The encoder 101 receives video and/or images from network 103 and/or from storage 105 and encodes the video and/or images into bitstreams and transmits the encoded video and/or images to decoder 107 via network 109. Storage device 105 may be part of a storage depository of multi-channel audio/video signals such as a storage repository of a store or a streaming video service, a separate storage component, a component of a mobile device, etc. The decoder 107 may be part of a device having a media player 111. The device may be a mobile device, a set-top device, a desktop computer, and the like.

Figure 2:
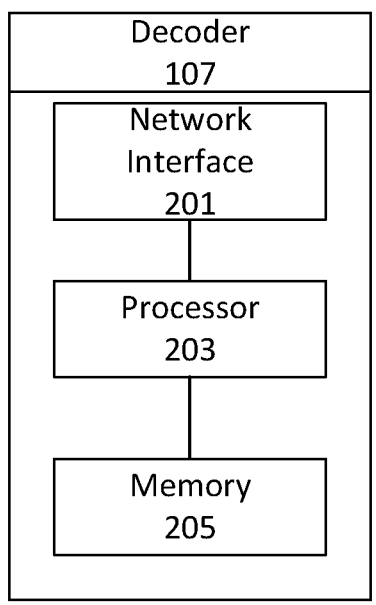
FIG. 2 is a block diagram illustrating a decoder according to some embodiments.

FIG. 2 is a block diagram illustrating elements of decoder 107 configured to decode video blocks and image blocks according to some embodiments of inventive concepts. As shown, decoder 107 may include a network interface circuit 201 (also referred to as a network interface or an interface or as a transceiver) configured to provide communications with other devices/entities/functions/etc. The decoder 107 may also include a processor circuit 203 (also referred to as a processor or processing circuitry) coupled to the network interface circuit 205, and a memory circuit 205 (also referred to as memory or as memory circuitry) coupled to the processor circuit 203. The memory circuit 205 may include computer readable program code that when executed by the processor circuit 203 causes the processor circuit to perform operations according to embodiments disclosed herein. The processor 203 may be a general purpose processor such as an ARM CPU, but it can also be a custom-built chip especially created for the purpose of decoding video, or a combination thereof.

According to other embodiments, processor circuit 203 may be defined to include memory so that a separate memory circuit is not required. As discussed herein, operations of the decoder 107 may be performed by processor 203 and/or network interface 201. For example, processor 203 may control network interface 201 to receive communications from encoder 101. Moreover, modules may be stored in memory 205, and these modules may provide instructions so that when instructions of a module are executed by processor 203, processor 203 performs respective operations.

The decoder 107 can, for example, be located in a receiver, such as in a video camera, set-top-box or a display, e.g. in a mobile device. Decoded pictures are output from the decoder 107 and sent to be displayed to a user on a screen or display of the decoder 107 or connected, including wirelessly connected, to the decoder 107. The output pictures may also be stored on disk or transcoded without display.

Figure 3:
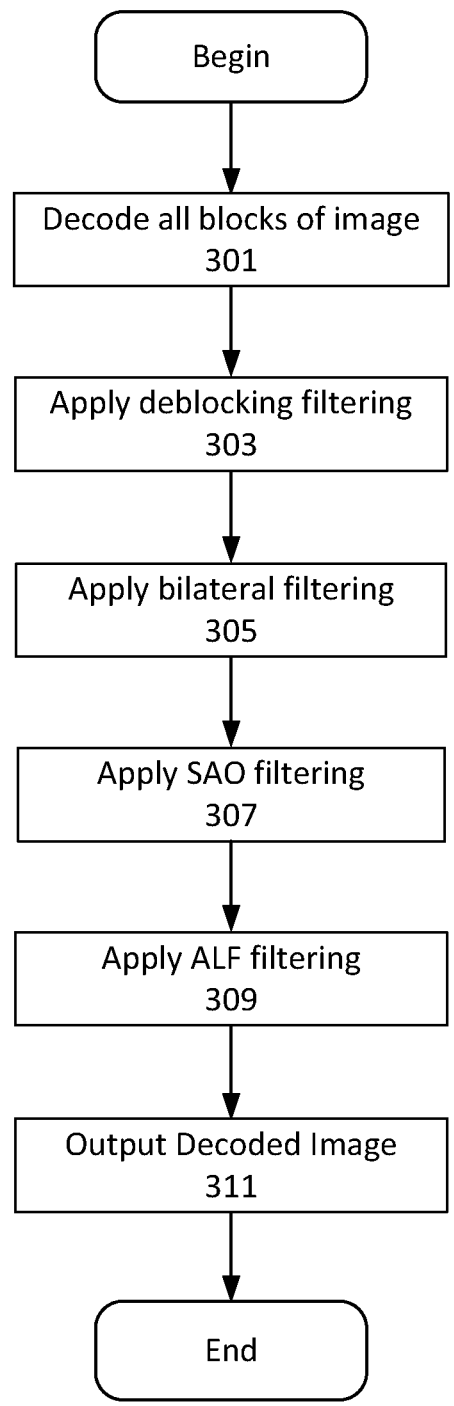
FIG. 3 is a block diagram illustrating a flow chart illustrating operations of a decoder in accordance with some embodiments of inventive concepts.

FIG. 3 is a flow chart diagram illustrating operations the decoder 107 may perform in decoding an image. In operation 301, the decoder 107 decodes all blocks of an image. Filtering operations, such as deblocking filtering in operation 303, bilateral filtering in operation 305, sample adaptive offset (SAO) filtering in operation 307, and adaptive loop filtering in operation 309. The decoded image is output in operation 311. For example, the decode image may be transmitted to a media player such as media player 111, to a set-top box, etc. The decoded image may also be stored in memory for prediction of subsequently decoded images.

In the description that follows, details on the bilateral filtering operation 305 shall be described. Some potential advantages of the inventive concepts of the bilateral filter used in bilateral filtering operation 305 that may be achieved shall be described.

The bilateral filter described herein may be placed as a loop filter, i.e., at the same level as, e.g., a deblocking filter, and not part of operation 301. This location at the same level avoids the issues of the filter being in the critical path of either intra blocks or inter blocks since all the intra blocks and inter block have already been decoded in operation 301 when the loop-filters are applied (such as in operations 303, 305, 307 and 309).

Since all intra blocks and inter blocks have been decoded, the bilateral filter may access samples from neighboring blocks when filtering the image, regardless of the block type of the neighboring filter. Hence expensive and cumbersome tests are not required to be performed to figure out if the neighboring block is of the right type and whether the bilateral filter is allowed to use samples from the neighboring block.

Additionally, since all samples have been decoded, samples may be used not only from blocks to the left and above the current block, but also from blocks to the right and below the current block. The use of these blocks may increase the BD-rate performance of the decoding method used.

The bilateral filter as described herein also avoids the non-local filtering step previously described. Thus, the extra latency associated with the non-local filtering step may be avoided. Furthermore, by avoiding this step, tables such as look-up tables may be used where the multiplication has already been pre-calculated and folded into the table. Hence, no expensive multiplications are needed.

Also, since these table values may be arbitrarily set, the inventive concepts are not constrained to one that implements a bilateral filter. For example, negative items may be used in the table to further increase BD-rate performance. Moreover, by reducing the table size to 16 items, it is possible to efficiently implement the method using single instruction multiple data (SIMD) code.

Diagonal samples may also be used in the filtering. The filtering of diagonal samples may further increase the BD-rate performance.

Thus, the multiplication-free filter that does not sit in the critical path of the decoder may lead to a higher BD-rate performance and may be implementable using SIMD code.

In the description that follows, filtering of intensity values, also known as luminance values, will be used in the description of inventive concepts. It should be understood that the inventive concepts may also be used for filtering of chroma samples or any other characteristic of a pixel such as R, G, B, non-constant luminance, constant luminance, any of the components of ICTCP, or any subsampled components such as Cb and Cr, as well as CT and CP etc.

Turning to FIG. 4, for purposes of explanation, filtering of sample $I_C$ shall be performed. The filtering may utilize any of the neighboring samples, i.e., using any of the neighboring intensities $I_L$, $I_R$, $I_A$, $I_B$, $I_{NW}$, $I_{NE}$, $I_{SW}$, and $I_{SE}$. In FIG. 4, $I_A$ is the intensity of the sample above the sample to be filtered, $I_B$ is the intensity of the sample below the sample to be filtered, $I_L$ is the intensity of the sample to the left of the sample to be filtered, $I_R$ is the intensity of the sample to the right of the sample to be filtered, $I_{NW}$ is the sample one step up and left of the sample to be filtered ("North-west"), $I_{NE}$ is the sample one step up and right of the sample to be filtered ("North-east"), $I_{SW}$ is the sample one step down and left of the sample to be filtered ("South-west"), $I_{SE}$ is the sample one step down and right of the sample to be filtered ("South-east"), $I_{AA}$ is the sample two steps above the sample to be filtered ("above-the-above"), $I_{BB}$ is the sample two steps below the sample to be filtered ("below-the-below"), $I_{LL}$ is the sample two steps to the left of the sample to be filtered ("left-of-the-left"), and $I_{RR}$ is the sample two steps to the right of the sample to be filtered ("right-of-the-right").

In various embodiments, different samples may be used to filter the sample $I_C$. For example, in one embodiment, $I_C$, $I_A$, $I_B$, $I_L$, and $I_R$ are used for filtering the intensity of the center sample $I_C$. In another embodiment, $I_C$, $I_A$, $I_B$, $I_L$, $I_R$, $I_{NW}$, $I_{NE}$, $I_{SW}$, and $I_{SE}$ are used for filtering the intensity of the center sample $I_C$. In yet another embodiment, $I_C$, $I_A$, $I_B$, $I_L$, $I_R$, $I_{NW}$, $I_{NE}$, $I_{SW}$, $I_{SE}$, $I_{AA}$, $I_{BB}$, $I_{LL}$, and $I_{RR}$, are used to filter the intensity of the center sample $I_C$.

It should be understood that the filtering of the intensity of the center sample $I_C$ is not constrained to using only the samples mentioned above. The filtering may include samples further away from the center sample as well. These samples may belong to the same block, such as the same TU, and these samples are all available. Some of the samples used in the filtering may be in a neighboring block, such as in a neighboring TU, a neighboring CU or even a neighboring CTU. In many cases the samples may be fetched from a neighboring block. However, when the needed samples are situated in a neighboring CTU, fetching of these samples may not be desirable and may not be possible to be acquired. When this occurs, the samples may need to be padded. Furthermore, sometimes the neighboring samples are not available. For instance, when the sample to be filtered is on the edge of the image, all neighboring samples such as for $I_C$ are not available. In such instances, the missing neighboring samples may be replaced with padding, mirroring or otherwise extending as shall be explained below.

In the following description, $I_C$, $I_A$, $I_B$, $I_L$, $I_R$, $I_{NW}$, $I_{NE}$, $I_{SW}$, and $I_{SE}$ shall be used to sample the center sample $I_C$. The operations described below may be used with other samples such as, for example, the use of $I_C$, $I_A$, $I_B$, $I_L$, $I_R$, $I_{NW}$, $I_{NE}$, $I_{SW}$, $I_{SE}$, $I_{AA}$, $I_{BB}$, $I_{LL}$, and $I_{RR}$ to sample the center sample.

A difference is formed between each neighboring sample and the center sample $I_C$. For example, the difference between the sample above the center sample and the center sample may be denoted as $dI_A$, where $dI_A = I_A - I_C$.

Likewise, $dI_B = I_B - I_C$, $d_{NW} = I_{NW} - I_C$, etc. The difference $dI_A$ may be used to obtain an influence value or modifier value $m_A$. The modifier value $m_A$ can be calculated directly using a look-up table (LUT) such as $m_A = LUT_0(dI_A)$.

In the case above, the LUT $LUT_0$ is defined both for negative and positive values of $dI_A$, since $dI_A$ can be both negative and positive. Likewise, difference $dI_B$ may be used to obtain an influence value or modifier value $m_B$, etc. In one embodiment, a portion (e.g., half, two-thirds, one-third, etc.) of the differences for the neighboring samples may be calculated and used to obtain the modifier value and the calculated differences and obtained modifier are reused for the remaining portion of neighboring samples.

In one embodiment, a LUT that is oddly symmetric around the value zero, such that $LUT(-x) = -LUT(x)$ may be used. There are many advantages that may result in having a LUT that is oddly symmetric around the value zero. Firstly, increases in intensity may be treated similarly to decreases in intensity.

Secondly, the influence of neighboring samples may be reused: If samples U and V are next to each other, so that U is to the left of V, the right intensity difference when filtering U will be $I_V - I_U$ and the modifier value will be $LUT_0(I_V - I_U)$. The modifier value may be stored as a variable s, where $s = LUT_0(I_V - I_U)$. Next when the sample V is filtered, the left intensity difference will be $I_U - I_V$. The modifier value will be $LUT_0(I_U - I_V)$, which is equal to $LUT_0(-(I_V - I_U)) = -LUT_0(I_V - I_U) = -s$. Hence instead of recalculating the modifier value, one can negate the stored value s.

Thirdly, only the LUT values for positive arguments x may be stored. The value of negative arguments may then be calculated as $-LUT(-x)$.

Thus, when the LUT is oddly symmetric around the zero value, a look-up table $LUT_1(x)$ may be defined for positive values of x (including zero), and the modifier value may be calculated using $$m_A = \begin{cases} LUT_1(dI_A) & \text{if } dI_A \geq 0 \\ -LUT_1(-dI_A) & \text{otherwise} \end{cases}$$

Since intensity values can vary between 0 and 1023, the difference between two such intensity values can vary from −1023 to 1023. Therefore, the look-up table $LUT_1$ must be defined for 1024 values (0, 1, . . . , 1023). For a hardware implementation, storing all 1024 values may be expensive. For a software implementation, efficiently implementing the look-up table operation for such a big look-up table may be difficult. Reducing the size of the look-up table may thus be beneficial for the hardware implementation and the software implementation.

One approach to reduce the size is by not having a unique look-up value for every individual argument $LUT_1(0)$, $LUT_1(1)$, $LUT_1(2)$, etc. For example, the same look-up value may be used for several arguments, such as, for instance, $LUT_1(0)=LUT_1(1)$, $LUT_1(2)=LUT_1(3)$, etc. Using the same look-up value for every second argument results in only half as many look-up values needing to be stored. This approach can be obtained by using a smaller look-up table $LUT_2$ and right-shifting the argument $dI_A$ one step using $sI_A=|dI_A|>>1$, where the |•| denotes taking the absolute value and >> denotes shifting rightwards. The modifier value can then be calculated as $$sI_A = |dI_A| \gg 1$$
$$m_A = \begin{cases} LUT_2(sI_A) & \text{if } dI_A \geq 0 \\ -LUT_2(-sI_A) & \text{otherwise} \end{cases}$$

One way to perform rounding is by adding 1 before the shifting is performed. Therefore, in another embodiment, the first step of $sI_A=|dI_A|>>1$ instead becomes $$sI_A=(|dI_A|+1)\gg 1.$$

However, reducing the LUT by half reduces the size from 1024 to 512 values. A further reduction in size may be achieved by shifting just three steps instead of just one step. The three step shifting may be performed by adding 4 before shifting. The modifier value may be calculated using:

$$sI_A = (|dI_A| + 4) \gg 3 \quad m_A = \begin{cases} LUT_3(sI_A) & \text{if } dI_A \geq 0 \\ -LUT_3(-sI_A) & \text{otherwise} \end{cases}$$

In another embodiment, the modifier value may instead be calculated according to $$sI_A = (dI_A + 4) \gg 3$$
$$m_A = \begin{cases} LUT_3(|sI_A|) & \text{if } dI_A \geq 0 \\ -LUT_3(|sI_A|) & \text{otherwise} \end{cases}.$$

However, in this case it is possible that the $m_A$ value resulting from $-dI_A$ will not be the negative of the value resulting from $dI_A$ due to different rounding. This property is desirable since it makes it possible to reuse modifier values between neighboring samples. Hence the first way of calculating the modifier value is in some cases preferable to the second. In other embodiments, these values may be calculated and both of the definitions are equally efficient.

The look-up table $LUT_3$ needs to store values for arguments 0 through 128, i.e., 129 values. While 129 values is significantly less than the 1024 values previously required, the 129 values may still be too many values for an efficient hardware implementation. It may also be too many values for an efficient software implementation using SIMD instructions.

The values in the look-up table may not all be large values. For example, when a neighboring sample has an intensity that is very different from that of the current sample, a reasonable assumption may be that the two samples have very little to do with each other. For example, the two samples may belong to two different objects in the scene, or the two samples may be taken from two different sides of an edge. In such scenarios, the filtering contribution from such a sample should be small or zero. This means that $LUT_3(x)$ may be small or zero for large values of x. Therefore, in one embodiment, the value is set to zero or a small value when the argument is larger than or equal to 15. Other values may be used. The modifier value in this embodiment when 15 is used may be calculated as:

$$sI_A = (|dI_A| + 4) \gg 3$$
$$cI_A = \min(sI_A, 15)$$
$$m_A = \begin{cases} LUT_4(cI_A) & \text{if } dI_A \geq 0 \\ -LUT_4(cI_A) & \text{otherwise} \end{cases}$$

where $cI_A$ is a value that is clamped to be no larger than 15. The new look-up table $LUT_4$ only needs to hold a value between 0 and 15, i.e., only 16 values. In one embodiment, the last value $LUT_4(15)$ equals zero, which means that all modifier values $m_A$ for larger differences will be zero as well.

In yet another embodiment of inventive concepts, the last value $LUT_4(15)$ may be set to a small negative value. This means that when filtering a sample that is very different from its neighbor, the neighbor will contribute negatively, i.e., the edge going from the sample to the neighbor will be enhanced.

One of the advantages of the inventive concepts that may be achieved is that some of the quantization artifacts that stem from the residual coding may be removed. In versatile video coding (VVC), the encoder encodes the residual by feeding it through a transform, such as a discrete cosine transform (DCT) transform. Afterwards the coefficients are quantized, (e.g., the coefficients are divided by the quantization parameter qp and rounded). The decoder receives the quantized parameters, multiplies the quantized parameters by qp, and performs the inverse transform to obtain the residual. However, due to the quantization, there may be ringing artifacts in the image since many coefficients have been removed. This phenomenon of ringing artifacts is also called the Gibbs phenomenon. The filtering described herein may counter these ringing artifacts. The ringing may be worse the more the data is quantized, i.e., the higher the quantization parameter qp is, the worse the ringing may be. Likewise, when the qp is small, such as qp=15, there may be almost no ringing and thus no filtering may be necessary.

To account for the quantization parameters, different LUTs can be used for different qps. For example, a different LUT may be used for every possible value of qp, from 0 to 63. However, such an approach would be expensive in terms of silicon surface area to store 64*16 values. Thus, in another embodiment the same LUT may be used for several qp values. In a preferred embodiment, the following LUTs are used:

$LUT_5$={0,5,5,5,4,2,2,2,1,1,1,1,0,1,1,−2} if 17<qp≤22

$LUT_5$={0,9,14,13,9,7,6,6,6,4,4,3,3,2,3,−2} if 22<qp≤27

$LUT_5$={0,12,20,24,28,27,25,19,15,16,14,11,9,10,− 3} if 27<qp≤32

$LUT_5$={0,15,26,35,42,45,50,50,50,46,36,27,23,21, 19,−3} if 32<qp≤37

$LUT_5$={0,21,29,42,46,51,55,55,56,55,52,33,28,21, 19,−3} if qp>37

In this embodiment, filtering may be turned off when qp≤17. Thus, to calculate the modifier value, the correct LUT is first selected using the above LUTs. Then the modifier value is calculated as $$sI_A = (|dI_A| + 4) \gg 3$$

$$cI_A = \min(sI_A, 15)$$

$$m_A = \begin{cases} LUT_5(cI_A) & \text{if } dI_A \geq 0 \\ -LUT_5(cI_A) & \text{otherwise.} \end{cases}$$

A modifier value is calculated analogously for the sample above ($m_A$, shown above), the sample below ($m_B$), the sample to the right ($m_R$), and the sample to the left ($m_L$). As an example, the modifier value for the sample to the right is calculated is calculated as $$dI_R = I_R - I_C$$

$$sI_R = (|dI_R| + 4) \gg 3$$

$$cI_R = \min(sI_R, 15)$$

$$m_R = \begin{cases} LUT_5(cI_R) & \text{if } dI_R \geq 0 \\ -LUT_5(cI_R) & \text{otherwise.} \end{cases}$$

The modifier values for the diagonal samples $I_{NW}$, $I_{NE}$, $I_{SW}$, $I_{SE}$ may similarly be calculated. There may be an additional step used for diagonal samples. Since these diagonal samples are further from the center pixel, their modification value should be smaller. The modifiers may therefore be divided by two. For example:

$$dI_{SW} = I_{SW} - I_C$$

$$sI_{SW} = (|dI_{SW}| + 4) \gg 3$$

$$cI_{SW} = \min(sI_{SW}, 15)$$

$$m_{SW} = \begin{cases} LUT_5(cI_{SW})/2 & \text{if } dI_R \geq 0 \\ -LUT_5(cI_{SW})/2 & \text{otherwise} \end{cases}$$

where "/" denotes integer division. Division is a computationally expensive operation. An approach to reduce the computation expense is to use rightwards shift. Hence, in an embodiment, the modifier may be calculated by $$dI_{SW} = I_{SW} - I_C$$

$$sI_{SW} = (|dI_{SW}| + 4) \gg 3$$

$$cI_{SW} = \min(sI_{SW}, 15)$$

$$m_{SW} = \begin{cases} LUT_5(cI_{SW}) \gg 1 & \text{if } dI_R \geq 0 \\ -(LUT_5(cI_{SW}) \gg 1) & \text{otherwise.} \end{cases}$$

When $dI_R$<0, $m_{SW}$=−($LUT_5(cI_{SW})$>>1), which has previously been used above. Another approach is to right-shift the value after the negation: $m_{SW}$=(−$LUT_5(cI_{SW})$)>>1. This approach will yield a different result, but the approach may be less costly to implement in certain circumstances. In order to obtain better rounding, adding 1 before shifting may be performed, such as using or, alternatively $$m_{SW} = \begin{cases} (LUT_5(cI_{SW}) + 1) \gg 1 & \text{if } dI_R \geq 0 \\ (-LUT_5(cI_{SW}) + 1) \gg 1 & \text{otherwise} \end{cases}$$

$$m_{SW} = \begin{cases} (LUT_5(cI_{SW}) + 1 \gg 1 & \text{if } dI_R \geq 0 \\ -((LUT_5(cI_{SW}) + 1) \gg 1) & \text{otherwise.} \end{cases}$$

If samples further out are being used, such as $I_{RR}$, an even stronger suppression may be used when calculating the modifier value. An example of the stronger suppression is to shift two steps, i.e., divide by 4.

After all modifier values have been calculated, the filtered sample $I_F$ may be calculated as $$I_F=I_C+((d_F*(m_A+m_B+m_L+m_R+m_{NW}+m_{NE}+m_{SW}+m_{SE})+8)\gg4),$$

where $d_F$, which is referred to as a strength factor, is a factor that depends on the block size and whether the block is an intra block or inter block. The >> symbol denotes arithmetic right shift. In one embodiment, the strength factor $d_F$=a*b where a=1 when the block is an intra block and a=0.75 when the block is an inter block. To calculate b, D=min(width, height) is first calculated, where width is the width of the block to be filtered and height is the height of the block to be filtered. The term "block" may mean a transform unit (TU) as defined in VVC, or a coding unit (CU) as defined in VVC, or any other rectangular block. In one embodiment, b=1.5 if D≤4, b=0.5 if D≥16 and b=1 otherwise. In other embodiments, a and b may be chosen to be different values. In one embodiment, table 1 is used to determine factor $d_F$:

TABLE 1

For determining dr from the smallest dimension D and whether it is an intra block or an inter block.

|  |  | D >16 b = 0.5 | 4 < D < 16 b = 1 | D ≤ 4 b = 1.5 |
|---|---|---|---|---|
| Intra block | a = 1 | 0.5 | 1 | 1.5 |
| Inter block | a = 0.75 | 0.375 | 0.75 | 1.125 |

Multiplying with the strength factor $d_F$ can be computationally expensive. Being able to calculate the filtered pixel value without multiplications reduces computational expense. Note that all the values in Table 1 can be calculated by shifting and addition/subtraction, which is computationally less expensive. As previously indicated, the filtered sample $I_F$ may be calculated as $$I_F = I_C + ((d_F*(m_A+m_B+m_L+m_R+m_{NW}+m_{NE}+m_{SW}+m_{SE})+8) >> 4),$$

or $$I_F = I_C + ((d_F * m_{sum}+8) >> 4),$$

where the modifier sum $m_{sum}=(m_A+m_B+m_L+m_R+m_{NW}+m_{NE}+m_{SW}+m_{SE})$. When $m_{sum}$ is assumed to be a positive value, $d_F*m_{sum}$, referred to herein as a correction value, denoted as $cv=d_F*m_{sum}$ can be calculated. The filtered sample may then be written as $$I_F = I_C + ((cv+8) >> 4).$$

For positive values of $m_{sum}$, the correction value $cv=d_F*m_{sum}$ for the different values of $d_F$ may be calculated as

TABLE 2

Ways to calculate the correction value $cv = d_F * m_{sum}$ according to one embodiment.

| | | |
|---|---|---|
| $0.5 * m_{sum} = m_{sum} >> 1$ | $1 * m_{sum} = m_{sum}$ | $1.5 * m_{sum} = m_{sum} + (m_{sum} >> 1)$ |
| $0.375 * m_{sum} = (m_{sum} >> 1) - (m_{sum} >> 3)$ | $0.75 * m_{sum} = m_{sum} - (m_{sum} >> 2)$ | $1.125 * m_{sum} = m_{sum} + (m_{sum} >> 3)$ |

Table 2 and the Tables 3-6 below are simplified tables in that the "Intra block" and "Inter block" row headers and the "D≥16", "4<D<16", and "D≤4" column headers are not provided in the tables. In these tables, the top left entry corresponds to the "Intra block" row and "D≥16" column, the top middle entry corresponds to the "Intra block" row and "4<D<16" column, and the top right entry corresponds to the "Intra block" row and "D≤4" column. Similarly, the bottom left entry corresponds to the "Inter block" row and "D≥16" column, the bottom middle entry corresponds to the "Inter block" row and "4<D<16" column, and the bottom right entry corresponds to the "Inter block" row and "D≤4" column.

In one embodiment, the calculations in Table 2 are used in calculating $m_{sum}$ if $m_{sum} \geq 0$. When $m_{sum} < 0$, $m_{sum}$ may be negated. In other words, Table 2 is used to calculate $d_F*m_{sum}$ (i.e., cv) and the result is negated.

Note that for positive values of $m_{sum}$, a software implementation can use integer multiplications, which are computationally inexpensive in software, Identical results may be obtained by calculating everything in terms of ⅛ths. As an example, for a positive number $m_{sum}$, $0.375*m_{sum}$ may be implemented as $3*m_{sum}>>3$, since $$0.375 = \frac{3}{8}.$$

The same calculations in terms of ⅛ths may done for the entire table as illustrated in Table 3.

TABLE 3

A software-friendly way to calculate the correction value $cv = d_F * m_{sum}$ according to one embodiment.

| | | |
|---|---|---|
| $0.5 * m_{sum} = 4 * m_{sum} >> 3$ | $1 * m_{sum} = 8 * m_{sum} >> 3$ | $1.5 * m_{sum} = 12 * m_{sum} >> 3$ |

TABLE 3-continued

A software-friendly way to calculate the correction value $cv = d_F * m_{sum}$ according to one embodiment.

| | | |
|---|---|---|
| $0.375 * m_{sum} = 3 * m_{sum} >> 3$ | $0.75 * m_{sum} = 6 * m_{sum} >> 3$ | $1.125 * m_{sum} = 9 * m_{sum} >> 3$ |

A hardware implementation may use the equivalent shown in Table 4.

TABLE 4

A hardware-friendly way to calculate the correction value $cv = d_F * m_{sum}$ according to one embodiment.

| | | |
|---|---|---|
| $0.5 * m_{sum} = (m_{sum} << 2) >> 3$ | $1 * m_{sum} = (m_{sum} << 3) >> 3$ | $1.5 * m_{sum} = ((m_{sum} << 3) + (m_{sum} << 2)) >> 3$ |
| $0.375 * m_{sum} = ((m_{sum} << 1) + m_{sum}) >> 3$ | $0.75 * m_{sum} = ((m_{sum} << 2) + (m_{sum} << 1)) >> 3$ | $1.125 * m_{sum} = ((m_{sum} << 3) + (m_{sum})) >> 3$ |

Checking whether $m_{sum} \geq 0$ may be costly in a software implementation and require use of a different piece of code. Therefore, in one embodiment, one of the above tables is used regardless if the $m_{sum}$ value is positive, negative or zero. In this case, >> denotes arithmetic right shift, where the sign bit is preserved during shift. This is in contrast to logical right shift, where the sign bit is not preserved.

A drawback with using the above equations is that the equations may round incorrectly. For example, if $m_{sum}=2$, the value $0.375*m_{sum}$ will be calculated as $3*2>>3=6>>3=0$, even though the correct rounding would be round(0.375*2)=round(0.75)=1. Therefore, to reduce the incorrect rounding, 4 is added before the last shift. The computations in Table 5 may be used.

TABLE 5

A software-friendly way to calculate the correction value $cv = d_F * m_{sum}$ without rounding errors according to one embodiment.

| | | |
|---|---|---|
| $0.5 * m_{sum} = (4 * m_{sum} + 4) >> 3$ | $1 * m_{sum} = (8 * m_{sum} + 4) >> 3$ | $1.5 * m_{sum} = (12 * m_{sum} + 4) >> 3$ |
| $0.375 * m_{sum} = (3 * m_{sum} + 4) >> 3$ | $0.75 * m_{sum} = (6 * m_{sum} + 4) >> 3$ | $1.125 * m_{sum} = (9 * m_{sum} + 4) >> 3$ |

For a hardware implementation, the equivalent computations provided in Table 6 may be used.

TABLE 6

A hardware-friendly way to calculate the correction value $cv = d_F * m_{sum}$ without rounding errors according to one embodiment.

| | | |
|---|---|---|
| $0.5 * m_{sum} = ((m_{sum} << 2) + 4) >> 3$ | $1 * m_{sum} = ((m_{sum} << 3) + 4) >> 3$ | $1.5 * m_{sum} = ((m_{sum} << 3) + (m_{sum} << 2) + 4) >> 3$ |
| $0.375 * m_{sum} = ((m_{sum} << 1) + m_{sum} + 4) >> 3$ | $0.75 * m_{sum} = ((m_{sum} << 2) + (m_{sum} << 1) + 4) >> 3$ | $1.125 * m_{sum} = ((m_{sum} << 3) + m_{sum} + 4) >> 3$ |

In the above embodiments, two terms (as well as the term 4) are used to calculate the result of the correction value $cv=d_F*m_{sum}$. However, the terms involving $m_{sum}$ may be shifted different amounts for different values of $d_F$. As an example, when calculating $0.5*m_{sum}$, $m_{sum}$ is shifted two steps, whereas when $1.125*m_{sum}$ is calculated, $m_{sum}$ is shifted three steps. For some implementations keeping the same number of shifts in the two terms may be easier to implement. Therefore, in one embodiment, only terms that are shifted the same amount regardless of the size of the block and type of block are used. Thus, instead of using Table 1 above, Table 7 is used.

TABLE 7

This table describes how to determine $d_F$ from the smallest dimension D and whether it is an intra block or an inter block in one embodiment.

|  | D ≥ 16 | 4 < D < 16 | D ≤ 4 |
|---|---|---|---|
| Intra block | 0.5 | 1 | 1.5 |
| Inter block | 0.5 | 1 | 1 |

For a hardware implementation, Table 7 can be efficiently computed using the calculations shown in Table 8.

TABLE 8

A hardware-friendly way to calculate $d^F * m_{sum}$ for the embodiment described in Table 7.

| $0.5 * m_{sum} =$ $(m_{sum}) >> 1$ | $1.0 * m_{sum} =$ $((m_{sum} << 1)) >> 1$ | $1.5 * m_{sum} =$ $((m_{sum} << 1) + m_{sum}) >> 1$ |
|---|---|---|
| $0.5 * m_{sum} =$ $(m_{sum}) >> 1$ | $1.0 * m_{sum} =$ $((m_{sum} << 1)) >> 1$ | $1.0 * m_{sum} =$ $((m_{sum} << 1)) >> 1$ |

One way to look at the resulting calculations is that either 0 or $m_{sum} >> 1$ is added in the first term and 0 or $m_{sum}$ is added in the other term, while shifting the same amount. Thus, the calculation of the correction value may be written as $$cv = (k_1 * (m_{sum} << 1) + k_2 * m_{sum}) >> 1,$$

where $k_1$ and $k_2$ are either 0 or 1. This can be implemented efficiently in a hardware architecture as an AND gate in front of an adder. Thus, the calculation can be written as $$cv = (k_1 \& (m_{sum} << 1) + k_2 \& m_{sum}) >> 1,$$

where the "&" denotes a logical (i.e., bit-wise) AND between the bit of the first operand and each bit of the second operand. The values for $k_1$ and $k_2$ that implement the correction value according to table 8 is summarized in the table below:

|  | D ≥ 16 | 4 < D < 16 | D ≤ 4 |
|---|---|---|---|
| Intra block | $k_1 = 0$, $k_2 = 1$ | $k_1 = 1$, $k_2 = 0$ | $k_1 = 1$, $k_2 = 1$ |
| Inter block | $k_1 = 0$, $k_2 = 1$ | $k_1 = 1$, $k_2 = 0$ | $k_1 = 1$, $k_2 = 0$ |

In general, the calculation of the correction value can be further written as $$cv = (k_1 * (m_{sum} << s_1) + k_2 * (m_{sum} + s_2) + p) >> r,$$

where the first term is shifted $s_1$ steps, the second term is shifted $s_2$ steps, p is added to the conditional sum before shifting r steps. Typically, $p = 2^{p-1}$, unless $r=1$ when $p=0$ is typically used. This more general formula can be applied also to the calculations of the correction value cv in Tables 5 and 6 if $s_1$ and $s_2$ are allowed to vary. However, as has been described, it may be advantageous to have $s_1$ and $s_2$ be fixed.

For a software implementation, it can be more efficient to use the calculations shown in Table 9.

TABLE 9

A software-friendly way to calculate $d_F * m_{sum}$ for the embodiment described in Table 7.

| $0.5 * m_{sum} =$ $(1 * m_{sum}) >> 1$ | $1.0 * m_{sum} =$ $(2 * m_{sum}) >> 1$ | $1.5 * m_{sum} =$ $(3 * m_{sum}) >> 1$ |
|---|---|---|
| $0.5 * m_{sum} =$ $(1 * m_{sum}) >> 1$ | $1.0 * m_{sum} =$ $(2 * m_{sum}) >> 1$ | $1.0 * m_{sum} =$ $(2 * m_{sum}) >> 1$ |

Both of these tables can be further simplified when calculating $1.0 * m_{sum}$ as shown in the calculations of Tables 10 and 11.

TABLE 10

A simplified version of Table 8.

| $0.5 * m_{sum} =$ $(m_{sum}) >> 1$ | $1.0 * m_{sum} = m_{sum}$ | $1.5 * m_{sum} =$ $((m_{sum} << 1) + m_{sum}) >> 1$ |
|---|---|---|
| $0.5 * m_{sum} =$ $(m_{sum}) >> 1$ | $1.0 * m_{sum} = m_{sum}$ | $1.0 * m_{sum} = m_{sum}$ |

And for the software case:

TABLE 11

A simplified version of Table 9.

| $0.5 * m_{sum} =$ $(1 * m_{sum}) >> 1$ | $1.0 * m_{sum} = m_{sum}$ | $1.5 * m_{sum} =$ $(3 * m_{sum}) >> 1$ |
|---|---|---|
| $0.5 * m_{sum} =$ $(1 * m_{sum}) >> 1$ | $1.0 * m_{sum} = m_{sum}$ | $1.0 * m_{sum} = m_{sum}$ |

A correctly rounded version may be determined by adding a constant before shifting (just as in Table 5). Hence in one embodiment of the present invention, a hardware implementation may perform the calculations in Table 12.

TABLE 12

A hardware-friendly way to calculate $d_F * m_{sum}$ with correct rounding.

| $0.5 * m_{sum} =$ $(m_{sum} + 1) >> 1$ | $1.0 * m_{sum} =$ $((m_{sum} << 1) + 1) >> 1$ | $1.5 * m_{sum} =$ $((m_{sum} << 1) + m_{sum} + 1)$ |
|---|---|---|
| $0.5 * m_{sum} =$ $(m_{sum} + 1) >> 1$ | $1.0 * m_{sum} =$ $((m_{sum} << 1) + 1) >> 1$ | $1.0 * m_{sum} =$ $((m_{sum} << 1) + 1) >> 1$ |

For a software implementation, the use of the calculations in Table 13 may be more efficient.

TABLE 13

A software-friendly way to calculate $d_F * m_{sum}$ with correct rounding.

| $0.5 * m_{sum} =$ $(1 * m_{sum} + 1) >> 1$ | $1.0 * m_{sum} =$ $(2 * m_{sum} + 1) >> 1$ | $1.5 * m_{sum} =$ $(3 * m_{sum} + 1) >> 1$ |
|---|---|---|
| $0.5 * m_{sum} =$ $(1 * m_{sum} + 1) >> 1$ | $1.0 * m_{sum} =$ $(2 * m_{sum} + 1) >> 1$ | $1.0 * m_{sum} =$ $(2 * m_{sum} + 1) >> 1$ |

However, for the case of a shift of one step, the versions in Table 10 and 11 are already correctly rounded, albeit using a different tie-breaking rule.

The result of the cv calculation can be used when calculating the filtered value, as described above, which is repeated here:

$$I_F = I_C + ((cv + 8) >> 4).$$

Inserting the value for $cv = (k_1 \& (m_{sum} << 1) + k_2 \& m_{sum}) >> 1$ gives $$I_F = I_C + ((((k_1 \& (m_{sum} << 1) + k_2 \& m_{sum}) >> 1) + 8) >> 4).$$

The above equation does right shifting twice, which is unnecessary. Denoting the unshifted value $(k_1 \& (m_{sum} \ll 1) + k_2 \& m_{sum})$ by $cv_{proto}$:

$$cv_{proto} = k_1 \& (m_{sum} \ll 1) + k_2 \& m_{sum}$$

results in $$cv = cv_{proto} \gg 1.$$

The calculation of the filtered sample becomes $$I_F = I_C + (((cv_{proto} \gg 1) + 8) \gg 4)$$

but this is the same as $$I_F = I_C + ((cv_{proto} + 16) \gg 5)$$

This is true since an addition of 8 can never change the last three bits of a number, and hence the bit we shift out from $cv_{proto}$ may never affect the result. This is valid both for positive and negative values of $(cv_{proto} \gg 1)$.

The value $cv_{proto}$ may be calculated using $$cv_{proto} = k_1 \& (m_{sum} \ll 1) + k_2 \& m_{sum}$$

and the filtered sample may be calculated using $$I_F = I_C + ((cv_{proto} + 16) \gg 5).$$

Note that in a software implementation $cv_{proto}$ may be calculated without the shift:

TABLE 14

A software-friendly way to calculate $cv_{proto}$

|  | D ≥ 16 | 4 < D < 16 | D ≤ 4 |
|---|---|---|---|
| intra block | $cv_{proto} = 1 * m_{sum}$ | $cv_{proto} = 2 * m_{sum}$ | $cv_{proto} = 3 * m_{sum}$ |
| inter block | $cv_{proto} = 1 * m_{sum}$ | $cv_{proto} = 2 * m_{sum}$ | $cv_{proto} = 2 * m_{sum}$ |

In yet another embodiment, it may be desirable to have a bit weaker filtering on intra blocks smaller than 4 samples:

TABLE 15

A software-friendly way to calculate Cvproto.

|  | D ≥ 16 | 4 < D < 16 | D = 4 | D < 4 |
|---|---|---|---|---|
| intra block | $cv_{proto} = 1 * m_{sum}$ | $cv_{proto} = 2 * m_{sum}$ | $cv_{proto} = 3 * m_{sum}$ | $cv_{proto} = 2 * m_{sum}$ |
| inter block | $cv_{proto} = 1 * m_{sum}$ | $cv_{proto} = 2 * m_{sum}$ | $cv_{proto} = 2 * m_{sum}$ | $cv_{proto} = 2 * m_{sum}$ |

In some embodiments, the difference $\Delta I_F$, also denoted here as the filtered difference, between the unfiltered sample $I_C$ and the filtered sample $I_F$ may be the only calculation of interest. In such cases, it is unnecessary to first calculate the filtered sample using $$I_F = I_C + ((cv_{proto} + 16) \gg 5)$$

just to remove $I_C$ again a moment later in calculating $\Delta I_F$ using $$\Delta I_F = I_F - I_C.$$

In such cases, it is therefore desirable to skip calculating $I_F$ and just calculate $\Delta I_F$ directly according to $$\Delta I_F = ((cv_{proto} + 16) \gg 5).$$

In some circumstances it may be desirable to control the overall strength of the filtering. As an example, we have noted that stronger filtering is often advantageous when coding computer-generated content, also known as screen content, such as computer games, PowerPoint presentations and screen captures. In this case, having a $\Delta I_F$ with a larger magnitude than for non-computer-generated content may be desirable. Thus, using a different shift value (and hence also a different rounding-addition value) may be desirable. As an example, to have twice the strength of the filtering, the calculation may be changed to add 8 and shift 4, $$\Delta I_F = ((cv_{proto} + 8) \gg 4).$$

If four times stronger filtering is desired, the calculation may be changed to add 4 and shift 3, $$\Delta I_F = ((cv_{proto} + 4) \gg 3).$$

In other circumstances having a lower filtering strength than normal may be desirable. As an example, the encoder has a choice of whether to include the bilateral filtering in the rate-distortion optimization. If it is included, then using $\Delta I_F = ((cv_{proto} + 16) \gg 5)$ ("full strength") may be the best choice. However, if bilateral filtering is not included, a better result might be to use $\Delta I_F = ((cv_{proto} + 32) \gg 6)$, which gives "half strength".

A more detailed description of what it entails to include the filter in the rate-distortion optimization or not shall now be provided:

The inventive concepts described herein can be implemented on top of the test model software VTM 5.0. The encoding in VTM 5.0 happens in two stages; in the first stage the encoder decides which block partitioning to use (i.e., the size and shapes of blocks), which prediction and transform to use etc., resulting in an image that has not been loop-filtered. In the second stage this image is processed by the loop filters (deblocking, SAO and ALF). During the first stage, the VTM 5.0 encoder reconstructs each block by inversely transforming the quantized coefficients, adding the prediction, and clipping. The distortion is then calculated between the original samples and the reconstructed samples, and a decision is based on this distortion and the coding cost. What is meant by "including the bilateral filter in the rate distortion optimization" is inserting a step of bilateral filtering after the clipping, so that the distortion is calculated on a bilaterally filtered block. A possible limitation of this approach is that some encoders evaluate most distortion calculations in the transform domain, and it may be costly to go back to the spatial domain to do bilateral filtering. However, including the bilateral filter in the rate distortion optimization helps the encoder make a good decision. As an example, a block that contains ringing may be a better choice than a smooth block, since the bilateral filter will later remove some of the ringing. By including bilateral filtering in the rate distortion optimization, it can be possible for the encoder to correctly select the block with ringing over the smooth block. Samples to the right and below the block are not available at this stage, so mirroring is used for these samples. For encoders willing to pay the "extra cost" of including the bilateral filter in the rate distortion optimization, the "full strength" bilateral filtering may be used. For encoders not willing to spend the extra cost of including the bilateral filter in the rate distortion optimization, the "half strength" bilateral filtering may be used as described above.

As an example, the following tests were run:

| Strength | RDO on/off | BD-rate for RA configuration (negative is good) |
|---|---|---|
| full strength | on | −0.66% |
| full strength | off | −0.03% |
| half strength | off | −0.18% |

As can be seen, the best gains (−0.66%) are obtained when the filter is at full strength and the rate distortion optimization (RDO) for the bilateral filter is turned on. However, if the RDO is off, it is better to use half strength (−0.18%) than to use full strength (−0.03%).

Since the decoder cannot know if the encoder has used RDO or not, the filter strength should to be signaled. Likewise, the decoder does not know what type of content is being compressed, i.e., if it is screen content or regular content, so the decoder doesn't know whether to use double strength or full strength. For this reason, it may be important for the filter strength to be signaled, so that the decoder can know what strength should be applied when filtering.

In one embodiment, the following signaling may be used:

| name | strength | formula | bits sent by encoder and received by decoder |
|---|---|---|---|
| half strength | 50% | $\Delta I_F = ((cv_{proto} + 32) >> 6)$ | 10 |
| full strength | 100% | $\Delta I_F = ((cv_{proto} + 16) >> 5)$ | 0 |
| double strength | 200% | $\Delta I_F = ((cv_{proto} + 8) >> 4)$ | 110 |
| 4× strength | 400% | $\Delta I_F = ((cv_{proto} + 4) >> 3)$ | 111 |

In the above example, a simple Huffman code was used to send the filter strength. In another example, a CABAC context may be used to signal and receive the filter strength. In another example, two bits are used to signal the filter strength, which can be called BIFStrength, and which can assume the values 0, 1, 2 and 3 as illustrated in the below table.

| strength | value of BIF Strength | bits sent or received |
|---|---|---|
| half strength | 0 | 00 |
| full strength | 1 | 01 |
| double strength | 2 | 10 |
| 4× strength | 3 | 11 |

$\Delta I_F$ can then be calculated using $$\Delta I_F = ((cv_{proto} + bif\_round\_add) >> bif\_round\_shift)$$

where bif_round_add=32>>BIFStrength, and where bif_round_shift=6−BIFStrength. In other words, when the value of BIFStrength is 2, the calculation becomes $$\Delta I_F = ((cv_{proto} + 32 >> 2) >> (6-2)) = ((cv_{proto} + 8) >> 4).$$

The filter strength can be signaled once per sequence (for instance, in the sequence parameter set, SPS), or once per picture (for instance, in the picture parameter set, PPS), or once per CTU or even once per block.

In the above embodiments, there can be quite a large step between the different filter strengths. For instance, between "double strength" and "full strength", there is a factor of two in strength. In some circumstances it may be more advantageous to use a finer granularity of filter strength. As an example, some natural content may be very sharp, but not as sharp as computer generated content. Hence it may be desirable to use a filter strength between 100% and 200%. In these cases it is possible to use the same formula for calculating $\Delta I_F$ as is used for the 100% strength, but when calculating $cv_{proto}$, instead of using Table 15 (repeated here for the convenience of the reader):

TABLE 15

A software-friendly way to calculate $cv_{proto}$.

| | D ≥ 16 | 4 < D < 16 | D = 4 | D < 4 |
|---|---|---|---|---|
| intra block | $cv_{proto} = 1 * m_{sum}$ | $cv_{proto} = 2 * m_{sum}$ | $cv_{proto} = 3 * m_{sum}$ | $cv_{proto} = 2 * m_{sum}$ |
| inter block | $cv_{proto} = 1 * m_{sum}$ | $cv_{proto} = 2 * m_{sum}$ | $cv_{proto} = 2 * m_{sum}$ | $cv_{proto} = 2 * m_{sum}$ |

Table 16 may be used

TABLE 16

A software-friendly way to calculate $cv_{proto}$.

| | D ≥ 16 | 4 < D < 16 | D = 4 | D < 4 |
|---|---|---|---|---|
| intra block | $cv_{proto} = 2 * m_{sum}$ | $cv_{proto} = 3 * m_{sum}$ | $cv_{proto} = 4 * m_{sum}$ | $cv_{proto} = 3 * m_{sum}$ |
| inter block | $cv_{proto} = 2 * m_{sum}$ | $cv_{proto} = 3 * m_{sum}$ | $cv_{proto} = 3 * m_{sum}$ | $cv_{proto} = 3 * m_{sum}$ |

One can see that the filter strength has doubled for blocks where D≥16, (multiplication is by 2 instead of by 1), but for blocks where 4<D<16, there is an increase of 3/2=150%, and for D=4 there is an increase of 4/3=133% for intra blocks. Note that the below formula may not be used when using Table 16

$$cv_{proto} = k_1 \& (m_{sum} << 1) + k_2 \& m_{sum}$$

for a hardware-friendly way of calculating $cv_{proto}$, since $cv_{proto} = 4 * m_{sum}$ cannot be implemented using that equation. However, if the formula is changed a bit to $$cv_{proto} = k_1 \& (m_{sum} << a) + k_2 \& (m_{sum} << b),$$

then multiplication by 1, 2, 3, 4, 5, 6 and 8 can be implemented as shown in Table 17 below:

TABLE 17

Efficient implementation of $cv_{proto}$ multiplication using just one addition.

| factor | binary form | $k_1$ | $k_2$ | a | b |
|---|---|---|---|---|---|
| 1 | 0001 | 0 | 1 | 1 | 0 |
| 2 | 0010 | 1 | 0 | 1 | 0 |
| 3 | 0011 | 1 | 1 | 1 | 0 |
| 4 | 0100 | 1 | 0 | 2 | 0 |
| 5 | 0101 | 1 | 1 | 2 | 0 |
| 6 | 0110 | 1 | 1 | 2 | 1 |
| 8 | 1000 | 1 | 0 | 3 | 0 |

Table 16 can also be efficiently implemented in hardware using just one addition. This way, the use of intermediate filter strengths for the bilateral filter may be used such as in the following table:

| name | strength | Table used for $cv_{proto}$ | formula | bits sent by encoder and received by decoder |
|---|---|---|---|---|
| half strength | 50% | 15 | $\Delta I_F = ((cv_{proto} + 32) >> 6)$ | 1110 |
| diminished strength | ~75% | 16 | $\Delta I_F = ((cv_{proto} + 32) >> 6)$ | 10 |

-continued

| name | strength | Table used for $cv_{proto}$ | formula | bits sent by encoder and received by decoder |
|---|---|---|---|---|
| full strength | 100% | 15 | $\Delta I_F = ((cv_{proto} + 16) >> 5)$ | 0 |
| enhanced strength | ~150% | 16 | $\Delta I_F = ((cv_{proto} + 16) >> 5)$ | 110 |
| double strength | 200% | 15 | $\Delta I_F = ((cv_{proto} + 8) >> 4)$ | 11110 |
| 4× strength | 400% | 15 | $\Delta I_F = ((cv_{proto} + 4) >> 3)$ | 11111 |

Using the above table results in using two additional filter strengths: "diminished strength" which is between "full strength" and "half strength", and "enhanced strength" which is between "full strength" and "double strength". Note that the strength values 75% and 150% respectively in the above table are just approximations, since different block sizes will have different relative strengths as described above.

In one embodiment, one may want to change the way the quantization parameter (QP) affects the filtering. As previously described, the LUT can be selected from the QP using $LUT_5=\{0,5,5,5,4,2,2,2,1,1,1,1,0,1,1,-2\}$ if $17<qp \leq 22$ $LUT_5=\{0,9,14,13,9,7,6,6,6,4,4,3,3,2,3,-2\}$ if $22<qp \leq 27$ $LUT_5=\{0,12,20,24,28,27,25,19,15,16,14,11,11,9,10,-3\}$ if $27<qp \leq 32$ $LUT_5=\{0,15,26,35,42,45,50,50,50,46,36,27,23,21,19,-3\}$ if $32<qp \leq 37$ $LUT_5=\{0,21,29,42,46,51,55,55,56,55,52,33,28,21,19,-3\}$ if $qp>37$ Using a LUT further down this list will give stronger filtering. Hence, it is possible to get stronger filtering by adding 5 to the QP before using the QP to select the LUT. As an example, if we have QP=20, normally we would select $LUT_5=\{0, 5, 5, 5, 4, 2, 2, 2, 1, 1, 1, 1, 0, 1, 1, -2\}$ according to the table above. But if we add 5, we instead get QP=20+5=25 which would mean that we instead would select $LUT_5=\{0, 9, 14, 13, 9, 7, 6, 6, 6, 4, 4, 3, 3, 2, 3, -2\}$. This would give a stronger filtering.

This offset of 5, which shall be called BIF_QP_OFFSET, can be signaled from the encoder and received in the decoder, for instance using the following table:

| BIF QP OFFSET received in decoder/sent in encoder | bits received in decoder/sent in encoder |
|---|---|
| −5 | 110 |
| 0 | 0 |
| 5 | 10 |
| 10 | 111 |

This offset can be sent per sequence (for instance in the SPS), per picture (for instance in the PPS), per CTU or even per block. The offset does not need to be a multiple of 5. As an example, it is possible to send the offset as

| BIF QP OFFSET received in decoder/sent in encoder | bits received in decoder/sent in encoder |
|---|---|
| −5 | 1111101 |
| −4 | 111101 |
| −3 | 11101 |
| −2 | 1101 |
| −1 | 101 |
| 0 | 0 |
| 1 | 100 |
| 2 | 1100 |
| 3 | 11100 |
| 4 | 111100 |
| 5 | 1111100 |
| 6 | 11111100 |
| 7 | 111111100 |
| 8 | 1111111100 |
| 9 | 11111111100 |

When signed integer 0-th order Exp-Golomb-coding is used (referred to as SVLC in the VTM-6.0 software) is used, the following table may be used:

| BIF QP OFFSET received in decoder/sent in encoder | bits received in decoder/sent in encoder |
|---|---|
| −5 | 0001011 |
| −4 | 0001001 |
| −3 | 00111 |
| −2 | 00101 |
| −1 | 011 |
| 0 | 0 |
| 1 | 010 |
| 2 | 00100 |
| 3 | 00110 |
| 4 | 0001000 |
| 5 | 0001010 |
| 6 | 0001100 |
| 7 | 0001110 |
| 8 | 000010000 |
| 9 | 000010010 |

Another alternative is to send the magnitude using unsigned integer 0-th order Exp-Golomb-coding (referred to as VLC in the VTM-6.0 software) and then the sign afterwards (unless the magnitude is zero):

| BIF QP OFFSET received in decoder/sent in encoder | bits received in decoder/sent in encoder |
|---|---|
| −5 | 00110 1 |
| −4 | 00101 1 |
| −3 | 00100 1 |
| −2 | 011 1 |
| −1 | 010 1 |
| 0 | 0 |
| 1 | 0100 |
| 2 | 0110 |
| 3 | 00100 0 |
| 4 | 00101 0 |
| 5 | 00110 0 |
| 6 | 001110 |
| 7 | 0001000 0 |
| 8 | 0001001 0 |
| 9 | 0001010 0 |

For some content, such as high-dynamic range content, it may be desirable to combine sending a strength and a BIF_QP_OFFSET.

In one embodiment the encoder may choose the strength parameter and/or the BIF_QP_OFFSET parameter based on the type of content. For instance, for natural content, a filter strength=10000 (full strength) and a BIF_QP_OFFSET=0 may be chosen, whereas for screen content, a filter strength=150% (extra strength) and a BIF_QP_OFFSET=5 may be chosen.

The encoder may select these parameters based on what produces the best BD-rate. For example, the encoder can try encoding the entire sequence both with full filter strength and with half filter strength, and see which version gives the lowest BD-rate. The encoder can then select this filter strength and signal the filter strength to the decoder.

A downside to encoding the entire sequence with both full filter strength and half filter strength is that the entire sequence may have to be encoded twice, i.e., a complexity increase of 100%. Therefore, in another embodiment, the original samples are analyzed. If the analysis indicates that there are sharp edges in the content, full filter strength may be used, whereas if the analysis indicates that there are not so many sharp edges in the content, a lower filter strength may be used.

One way to perform this analysis can be to simply calculate the gradients in the x- and y-dimensions using a filter such as 0 0 0
-1 0 1
0 0 0 in the x-dimension and

0 -1 0
0 0 0
0 1 0 in the y-dimension. Each resulting filtered image (one for the x-direction and one for the y-direction) are then squared and summed to get a comparison value. These two values are added together and compared against a threshold value. If the comparison value is lower than the threshold, we may choose the lower strength (or the smaller BIF_QP_OFFSET value), whereas if the comparison value is higher than the threshold, we may choose the higher strength (or the larger BIF_QP_OFFSET value). Different filters may be used, and absolute values may be used rather than squaring etc. The summed value may be corrected for the resolution. As an example, a single Laplacian filter may be used instead the two x- and y-gradient filters described above:

0 1 0
1 -4 1
0 1 0 and the result of this filter may then be squared and checked against a threshold. In yet another embodiment, instead of summing the squared values and comparing against a threshold, it is possible to calculate the maximum value of the squared values against a threshold. In another embodiment, one may instead count how many times an individual squared value exceeds a threshold, and use this number to decide the filter strength by comparing this number against a threshold. Again, different filters may be used, and absolute values may be used rather than squaring etc.

Another possible approach of analyzing the original samples may be to train a neural network to select the filter strength given part of an input image, or the entire image. The neural network can be trained with several images or small clips of video. To get the ground truth, the images or small clips of video may be encoded with both filter strengths and the filter strength giving the best BD-rate is selected as ground truth for all the images in that video clip. After training, the encoder can then use the neural network to decide whether an image should be compressed using a higher filter strength or lower filter strength. The encoder then signals this filter strength to the decoder. A similar method can be used to select an appropriate BIF_QP_OFFSET parameter.

This analysis can be performed on the first image in the sequence and then the encoder may signal that this strength is used for the entire sequence. The analysis can also be carried out on every image in the sequence and the encoder may signal a new value for every image. It is also possible to carry out the analysis on all images in a group of pictures (GOP) and take a decision (for instance using a majority decision) to use the same value for every image in the GOP.

Padding

Sometimes the neighboring samples are not always available. An example of this is when the sample to be filtered is on the edge of the image. In this case the samples may be replaced with padding, mirroring, or otherwise be extended. One way of padding is to extend the image. For example, when filtering the border sample $a_0$, there are no samples available to the left:

[outside] [outside] [outside] $I_{a0}$, $I_{a1}$, $I_{a2}$, $I_{a3}$, ...

The left may be extended by filling the outside samples with $I_{a0}$:

[$I_{a0}$], [$I_{a0}$], [$I_{a0}$], $I_{a0}$, $I_{a1}$, $I_{a2}$, $I_{a3}$, ...

where the brackets indicate padded samples. Mirroring may be applied by repeating the sample $I_{a0}$ in the closest missing sample and the continue with $I_{a1}$, $I_{a2}$, etc:

[$I_{a2}$], [$I_{a1}$], [$I_{a0}$], $I_{a0}$, $I_{a1}$, $I_{a2}$, $I_{a3}$, ...

However, both of these methods will result in that the sample directly to the left being identical to the sample being filtered. This in turn means that the difference $d_L$ $I_L - I_C = I_{a0} - I_{a0}$ will be equal to zero. This will result in a modifier value of 0 for the left neighbor, $m_L = 0$. Hence the filtering will not be influenced by the left sample.

An alternative may therefore be to do odd mirroring, i.e., to not include the border sample $I_{a0}$ in the mirroring. In this case, the mirrored sequence will become

[$I_{a3}$], [$I_{a2}$], [$I_{a1}$], $I_{a0}$, $I_{a1}$, $I_{a2}$, $I_{a3}$, ...

In this case, the difference $d_L$ between the sample to be filtered, $I_{a0}$, and the one immediately to the left will become $d_L = I_L - I_C = I_{a1} - I_{a0}$ which will not necessarily be zero. This means in turn that the modifier value from the left, $m_L$ may be nonzero, which will contribute to the filtering of the sample $I_{a0}$. Hence it is possible to get filtering impact also from the left in this case. However, this approach may instead result in the filtering being too strong, since the same filtering modifier is used from both the left and the right side. Therefore, in one embodiment, the modifier values emanating from border samples are multiplied by a constant smaller than one. As an example, if the constant 0.5 is used, the border sample will get a modifier value of $0.5 * m_L$ from the left side, and $m_R = m_L$ from the right side. This means that the total modifier value will be $1.5 * m_R$, which is in-between what the total modifier value is with even mirroring (which would yield a modifier value of only $m_R$) and what the total modifier value is with odd mirroring (which would give a modifier value of $2 * m_R$). It should be noted that instead of multiplying, implementing the constant multiplication with 0.5 as a bitshift $m_L >> 1$ may be possible. Other constants may be used.

Operations of the decoder 107 (implemented using the structure of the block diagram of FIG. 2) will now be discussed with reference to the flow chart of FIGS. 5-8 according to some embodiments of inventive concepts. For example, modules may be stored in memory 205 of FIG. 2, and these modules may provide instructions so that when the instructions of a module are executed by respective decoder processing circuitry 203, processing circuitry 203 performs respective operations of the flow chart.

Figure 5:
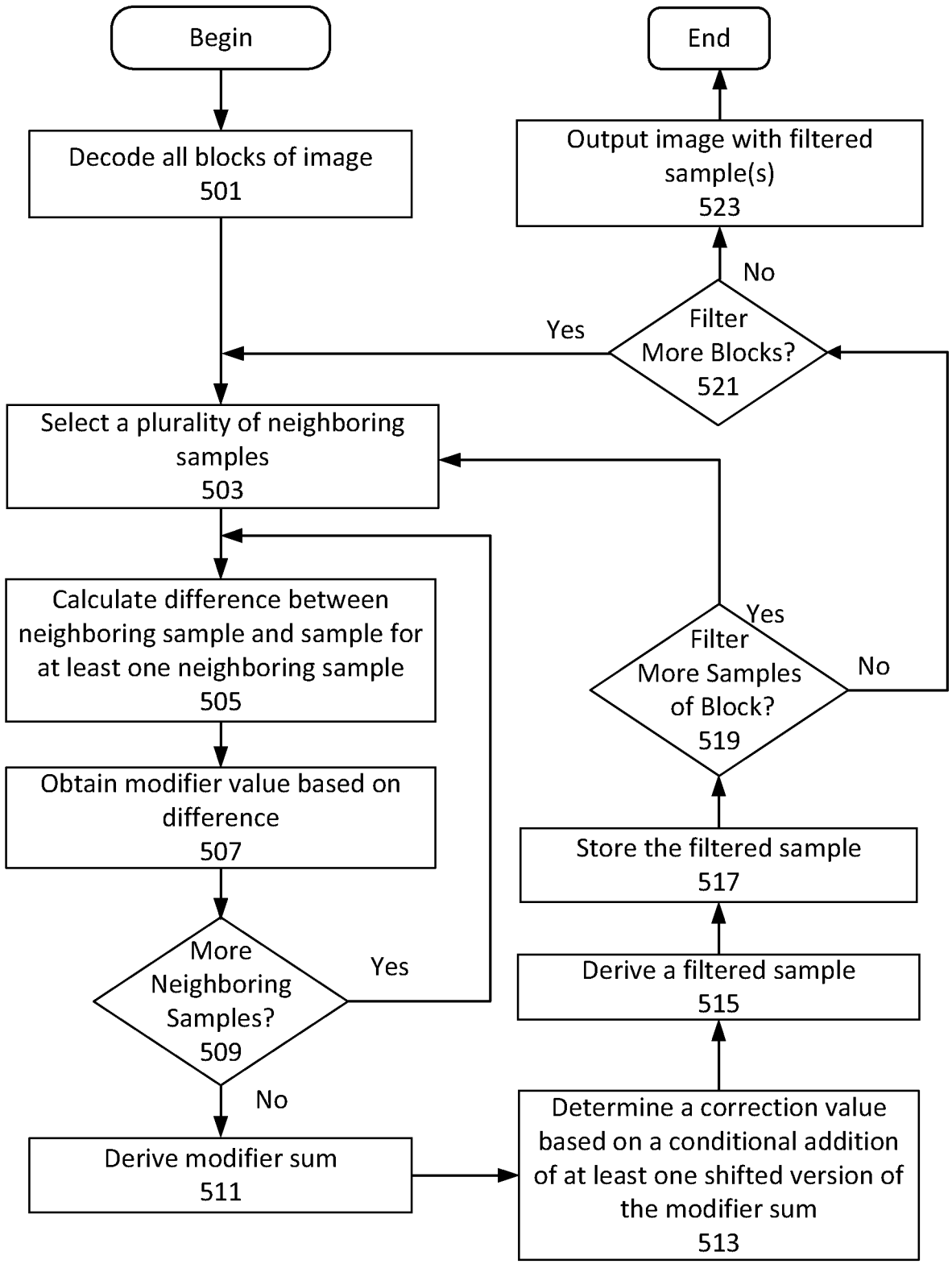
FIGS. 5-8 are flow charts illustrating operations of a decoder according to some embodiments of inventive concepts.

Turning to FIG. 5, at operation 501, the processor 203 may decode all blocks of an image. The image may be received via network interface 201 from the encoder 101 or other entities such as other encoders, a base station of a network such as a base station of network 109 or network 103.

In operation 503, the processor 203 may select a plurality of neighboring samples of the sample being filtered. The plurality of neighboring samples may be selected as described above. For example, different samples may be used to filter the sample being filtered (e.g., $I_C$). For example, in one embodiment, $I_C$, $I_A$, $I_B$, $I_L$, and $I_R$ may be used for filtering the sample $I_C$. In another embodiment, $I_C$, $I_A$, $I_B$, $I_L$, $I_R$, $I_{NW}$, $I_{NE}$, $I_{SW}$, and $I_{SE}$ may be used for filtering the sample $I_C$. In yet another embodiment, $I_C$, $I_A$, $I_B$, $I_L$, $I_R$, $I_{NW}$, $I_{NE}$, $I_{SW}$, $I_{SE}$, $I_{AA}$, $I_{BB}$, $I_{LL}$, and $I_{RR}$, may be used to filter the sample $I_C$.

In operation 505, for at least one neighboring sample, the processor 203 may calculate the difference between the neighboring sample and the sample being filtered. For example, the calculation may be performed as described above (e.g., $dI_A = I_A - I_C$). For example, the processor 203 may calculate the difference between a neighboring sample and the sample being filtered for a portion (e.g., half, two-thirds, etc.) of the plurality of neighboring sample and reuse the calculated difference for the remaining portion of the plurality of neighboring samples.

In operation 507, the processor 203 may obtain a modifier value based on the difference calculated in operation 505. The modifier may be obtained from a look-up table as described above. For a sample in which a calculated difference was reused, the modifier value obtained for the calculated difference that is being reused is also reused for the sample.

The processor 203 may determine when the block being filtered is located at an edge of the image. Responsive to the block being filtered being located at an edge of the image, the processor 203 may determine which samples of the sample above $I_C$, the sample below $I_C$, the sample to the left of $I_C$, the sample to the right of $I_C$, the sample one step up and left of $I_C$, the sample one set up and right of $I_C$, the sample one step below and left of $I_C$, and the sample one step below and right of $I_C$ is a missing sample. For each missing sample, the processor may set the modifier value for the missing sample to be a predetermined value of the modifier value of a sample located opposite the missing sample on the other side of the sample being filtered. For example, the predetermined value may be a constant value smaller than 1 in one embodiment.

In operation 509, the processor 203 may determine if there are more neighboring samples to process. If there are more neighboring samples to process, processor 203 may perform operations 505 and 505 for the remaining neighboring samples of the plurality of neighboring samples that are to be processed.

When the difference calculation and obtaining of the modifier value has been completed for the plurality of neighboring samples selected in operations 505 and 507, the processor 203 may derive the modifier sum in operation 511. As described above, the modifier sum is based on the sum of modifier values for the plurality of neighboring samples. For example, if the plurality of neighboring samples was selected to be the sample above $I_C$, the sample below $I_C$, the sample to a left of $I_C$, the sample to a right of $I_C$, the sample one step up and left of $I_C$, the sample one step up and right of $I_C$, the sample one step below and left of $I_C$, and the sample one step below and right of $I_C$, then the modifier sum may be based on the sum of modifier values for the samples (e.g., $m_{sum}$ ($m_A + m_B + m_L + m_R + m_{NW} + m_{NE} + m_{SW} + m_{SE}$)).

In operation 513 the processor 203 may determine a correction value based on a conditional addition of at least one shifted version of the modifier sum, where each shift of the at least one shifted version has a same number of shift steps in each determination of the correction value. In one embodiment, the correction value may be determined by determining $cv = (k_1 * (m_{sum} << 1) + k_2 * m_{sum}) >> 1$, where k_1 and k_2 is set to a 0 or a 1 based on the type of block and the minimum of the width and the height of the block. For example, $k_1$ may be set to 0 responsive to a minimum of a width and a height of the block being filtered is greater than or equal to a first value and may be set to 1 responsive to the minimum of the width and the height of the block being filtered is less than the first value and $k_2$ may be set to 1 responsive to the block being an intra block and the minimum of the width and the height of the block being filtered is less than or equal to a second value that is smaller than the first value and may otherwise be set to 0. In another embodiment, the correction value may be determined by determining $cv = (k_1 \& (m_{sum} << 1) + k_2 \& m_{sum}) >> 1$, wherein $k_1$ and $k_2$ is set to a 0 or a 1 based on the type of block and the minimum of the width and the height of the block as described above, and & denotes a logical (i.e., bit-wise) AND between the bit of the left operand and each bit of the right operand. In another embodiment, the correction value may be determined by determining $cv_{proto} = k_1 \& (m_{sum} << a) + k_2 \& (m_{sum} << b)$, wherein $cv_{proto}$ is the correction value, $k_1$ and $k_2$ is set to a 0 or a 1 based on the type of block and the minimum of the width and the height of the block, & denotes a logical AND between the bit of the left operand and all bits of the right operand, << a is a left shift by a steps, and << b is a left shift by b steps. The parameters a and b may be determined by using a look-up table.

Figure 7:
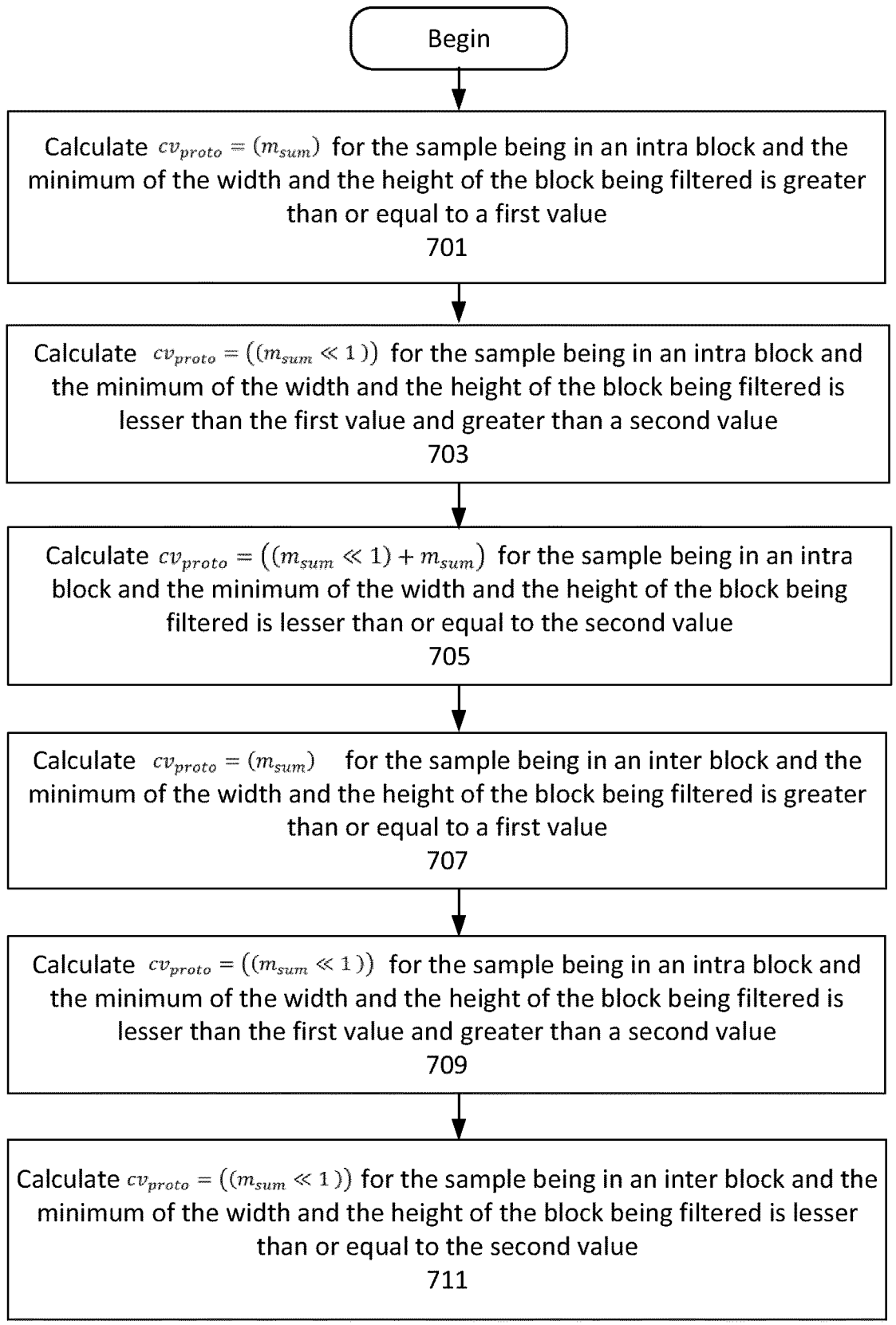

Turning to FIG. 7, in one embodiment, the correction value may be determined by the processor 203 performing operations 701, 703, 705, 707, 709, and 711. Specifically, in operation 701, the processor 203 may calculate $cv_{proto} = (m_{sum})$ for the sample being in an intra block and the minimum of the width and the height of the block being filtered is greater than or equal to a first value. In one embodiment the first value is based on a minimum of the width and height of the block being greater than or equal to 16.

In operation 703, the processor 203 may calculate $cv_{proto} = ((m_{sum} << 1))$ for the sample being in an intra block and the minimum of the width and the height of the block being filtered being lesser than the first value and greater than a second value. In one embodiment the second value is based on a minimum of the width and height of the block being greater than 4.

In operation 705, the processor 203 may calculate $cv_{proto} = ((m_{sum} << 1) + m_{sum})$ for the sample being in an intra block and the minimum of the width and the height of the block being filtered being lesser than or equal to the second value.

In operation 707, the processor 203 may calculate $cv_{proto} = (m_{sum})$ for the sample being in an inter block and the minimum of the width and the height of the block being filtered is greater than or equal to the first value.

In operation 709, the processor 203 may calculate $cv_{proto} = ((m_{sum} << 1))$ for the sample being in an inter block and the minimum of the width and the height of the block being filtered being lesser than the first value and greater than the second value.

In operation 711, the processor 203 may calculate $cv_{proto}=((m_{sum}<<1))$ for the sample being in an inter block and the minimum of the width and the height of the block being filtered being lesser than or equal to the second value.

Returning to FIG. 5, in operation 515, processor 203 may derive a filtered sample based on the sample to be filtered and the correction value. The processor 203 may derive the filtered sample by calculating $I_F=I_C+(cv+16)>>5)$, wherein $I_F$ is the filtered sample, $I_C$ is the sample being filtered, and cv is the correction value. In other embodiments, the processor 203 may derive the filtered sample by calculating $I_F=I_C+(cv+8)>>4)$ where cv is the correction value. In another embodiment, the processor 203 may derive the filtered sample by calculating $\Delta I_F=(cv_{proto}+16)>>5)$.

Figure 9:
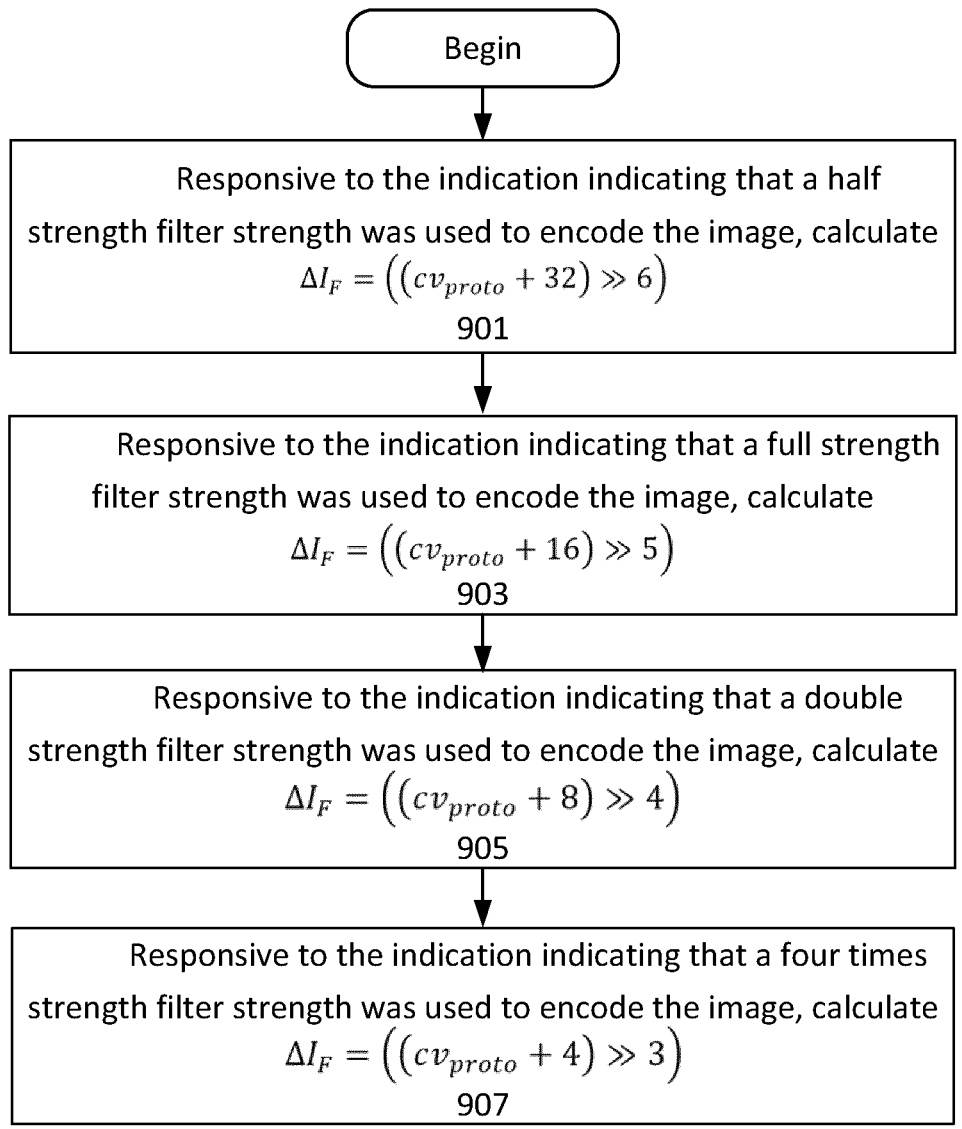
FIG. 9 is a flow diagram illustrating an operation for calculating a filtered sample based on an indication of filter strength according to some embodiments of inventive concepts.

In further embodiments, the processor 203 may derive the filtered sample by receiving an indication of a filter strength used to encode the image and calculating the filtered sample based on the indication of the filter strength. The indication of the filter strength may be received via a number of bits that define the filter strength. In these embodiments where filters strengths may be used, the indication of the filter strength is used to determine the calculation to use. For example, referring to FIG. 9, in operation 901, responsive to the indication indicating that a half strength filter strength was used to encode the image, the processor 203 may calculate $\Delta I_F=((cv_{proto}+32)>>6)$, wherein $\Delta I_F$ is the filtered difference, $cv_{proto}$ is the correction value, and >>6 is a right shift by 6 steps. Responsive to the indication indicating that a full strength filter strength was used to encode the image, the processor 203 in operation 903 may calculate $\Delta I_F=((cv_{proto}+16)>>5)$, wherein >>5 is a right shift by 5 steps. Responsive to the indication indicating that a double strength filter strength was used to encode the image, the processor 203 in operation 905 may calculate $\Delta I_F((cv_{proto}+8)>>4)$ wherein >>4 is a right shift by 4 steps. Responsive to the indication indicating that a four times strength filter strength was used to encode the image, the processor 203 in operation 907 may calculate $\Delta I_F=((cv_{proto}+4)>>3)$ wherein >>3 is a right shift by 3 steps.

Returning to FIG. 5, in operation 517, the processor 203 may store the filtered sample.

In operation 519, the processor 203 may determine whether there are more samples of the block are to be filtered. When there are more samples to be filtered, the processor 203 may repeat operations 505 to 519 for each of the remaining samples to be filtered.

In operation 521, the processor 203 may determine whether there are more blocks to be filtered. When there are more blocks to be filtered, the processor 203 may perform operations 503 to 521 for each block. Operations 501 to 521 may be performed by the processor 203 for each image where samples of a block of the image are selected for filtering.

In operation 523, when there are no more blocks to be filtered, the processor 203 may output the image containing the filtered sample(s).

Figure 6:
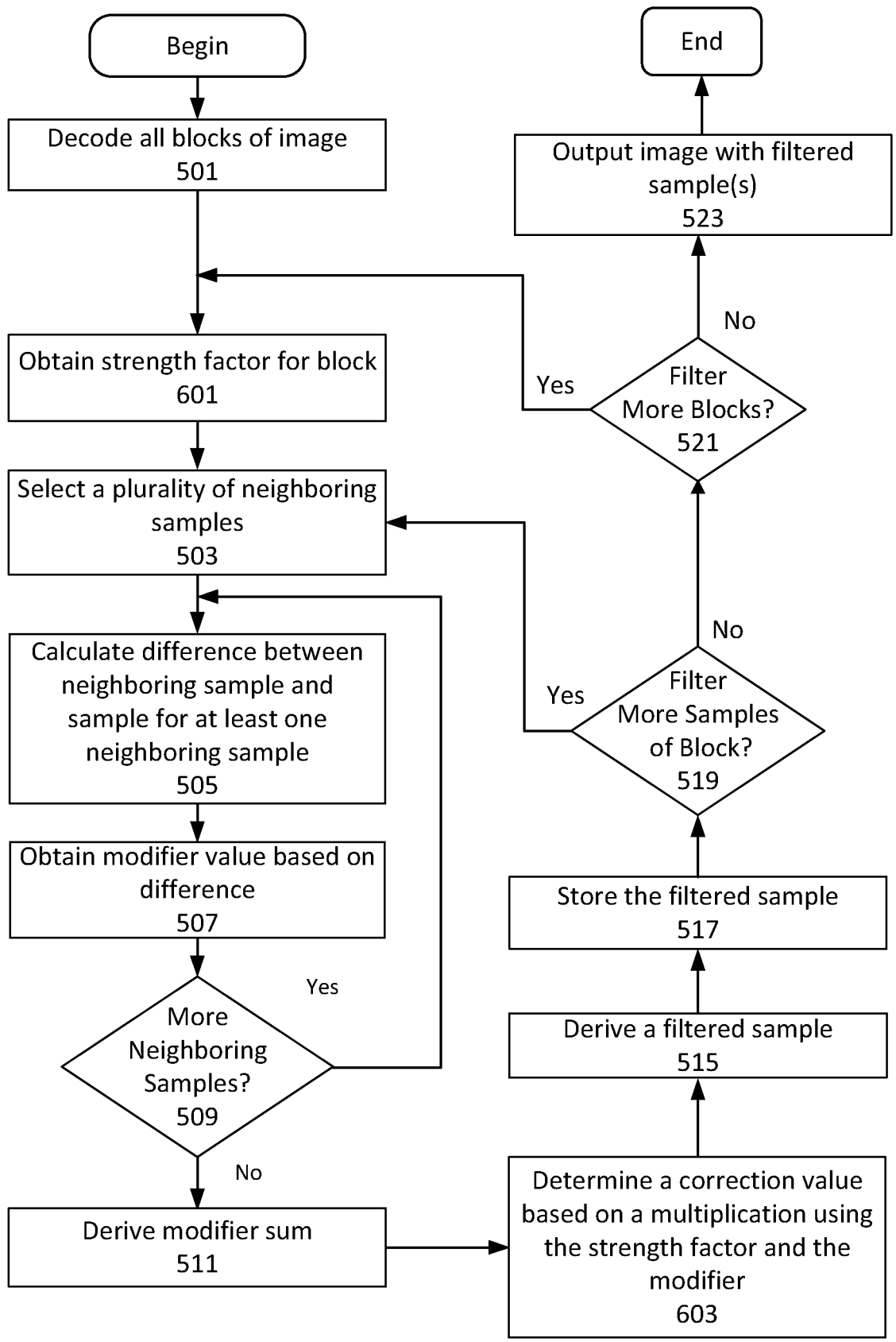

FIG. 6 illustrates another embodiment of decoder operations. Many of the same operations described in FIG. 5 are performed by the processor 203 in this embodiment. However, an additional step and an alternate step is provided in FIG. 6. Specifically, in operation 601, processor 203 may obtain a strength factor $d_F$. The strength factor $d_F$ may be based on at least one of the type of the block being filtered and the size of the block being filtered. The processor 203 may determine a minimum of the width and the height of the block being filtered and may determine the type of the block being filtered. For example, the type of the block being filtered may be an intra block, an inter block, etc. The strength factor may be selected based on the minimum of the width and the height and on the type of the block being filtered.

In the embodiment illustrated in FIG. 6, in operation 603 the correction value may be determined by determining $cv=d_F*m_{sum}$ wherein cv is the correction value, $d_F$ is the strength factor, and $m_{sum}$ is the modifier sum.

Figure 8:
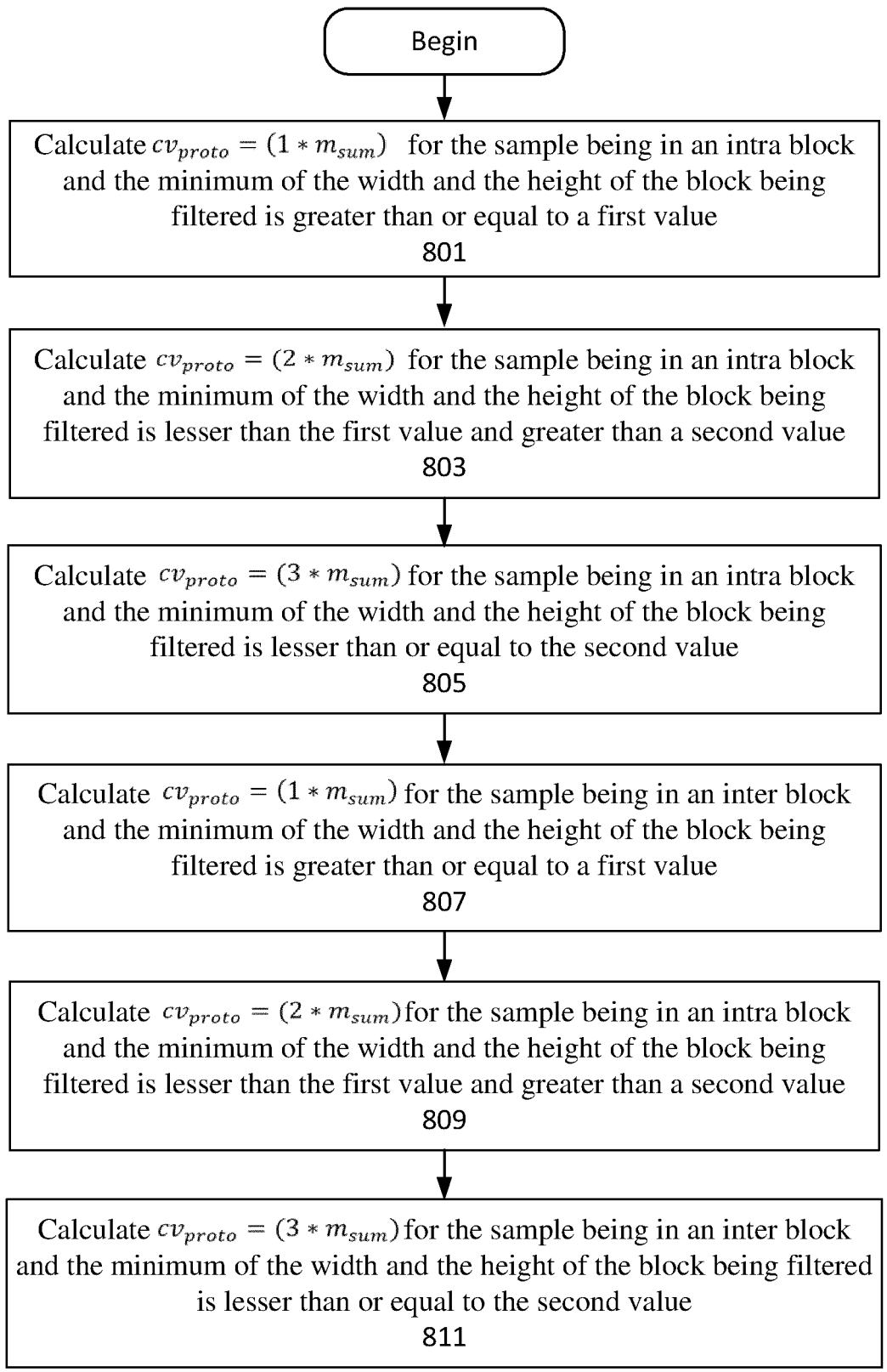

Turning to FIG. 8, in one embodiment, the correction value may be determined by the processor 203 performing operations 801, 803, 805, 807, 809, and 811. Specifically, in operation 801, the processor 203 may calculate $cv_{proto}=(1*m_{sum})$ for the sample being in an intra block and the minimum of the width and the height of the block being filtered is greater than or equal to a first value. In one embodiment the first value is based on a minimum of the width and height of the block being greater than or equal to 16.

In operation 803, the processor 203 may calculate $cv_{proto}=(2*m_{sum})$ for the sample being in an intra block and the minimum of the width and the height of the block being filtered being lesser than the first value and greater than a second value. In one embodiment the second value is based on a minimum of the width and the height of the block being greater than 4.

In operation 805, the processor 203 may calculate $cv_{proto}=(3*m_{sum})$ for the sample being in an intra block and the minimum of the width and the height of the block being filtered being lesser than or equal to the second value.

In operation 807, the processor 203 may calculate $cv_{proto}=(1*m_{sum})$ for the sample being in an inter block and the minimum of the width and the height of the block being filtered is greater than or equal to the first value, In operation 809, the processor 203 may calculate $cv_{proto}=(2*m_{sum})$ for the sample being in an inter block and the minimum of the width and the height of the block being filtered being lesser than the first value and greater than the second value.

In operation 811, the processor 203 may calculate $cv_{proto}=(2*m_{sum})$ for the sample being in an inter block and the minimum of the width and the height of the block being filtered being lesser than or equal to the second value.

Returning to FIG. 6, operations 515-523 are performed as described above. In operation 521, processor 203 may determine whether there are more blocks to be filtered. When there are more blocks to be filtered, the processor 203 may perform operations 601, 503 to 511, 603, and 515-521 for each block. Operations 501, 601, 503-511, 603, and 515 to 523 may be performed by the processor 203 for each image where samples of a block of the image are selected for filtering.

Example embodiments are discussed below.

1. A method performed by a decoder comprising:
  decoding (501) all blocks of an image that has been encoded;
  filtering at least one sample of at least one block of the image by, for each block being filtered:
    for each sample being filtered of the at least one sample:
      selecting (503) a plurality of neighboring samples of the sample being filtered;
      for at least one neighboring sample of the plurality of neighboring samples:
        calculating (505) a difference between the neighboring sample and the sample being filtered; and obtaining (507) a modifier value based on the difference;

deriving (511) a modifier sum based on a sum of the modifier values for the plurality of neighboring samples;

determining (513) a correction value based on a conditional addition of at least one shifted version of the modifier sum, where each shift of the at least one shifted version has a same number of shift steps in each determination of the correction value;

deriving (515) a filtered sample based on the sample to be filtered and the correction value; and replacing (517) the sample being filtered with the filtered sample; and outputting (521) the at least one block with the filtered sample towards an output of the decoder.

2. The method of Embodiment 1, wherein obtaining the modifier value comprises: obtaining the modifier value from a lookup table.

3. The method of any of Embodiments 1-2 wherein determining the correction value comprises determining $$cv = (k_1 * (m_{sum} << 1) + k_2 * m_{sum}) >> 1,$$

wherein cv is the correction value, $k_1$ and $k_2$ is set to a 0 or a 1 based on the type of block and the minimum of the width and the height of the block, <<1 is a left shift by one step, and >>1 is a right shift by one step.

4. The method of any of Embodiments 1-2 wherein determining the correction value comprises determining $$cv_{proto} = (k_1 * (m_{sum} << 1) + k_2 * m_{sum}),$$

wherein $cv_{proto}$ is the correction value, $k_1$ and $k_2$ is set to a 0 or a 1 based on the type of block and the minimum of the width and the height of the block, and <<1 is a left shift by one step.

5. The method of any of Embodiments 1-2 wherein determining the correction value comprises determining $$cv = (k_1 \& (m_{sum} << 1) + k_2 \& m_{sum}) >> 1,$$

wherein cv is the correction value, $k_1$ and $k_2$ is set to a 0 or a 1 based on the type of block and the minimum of the width and the height of the block, & denotes a logical AND between the bit of the left operand and all bits of the right operand, <<1 is a left shift by one step, and >>1 is a right shift by one step.

6. The method of any of Embodiments 1-2 wherein determining the correction value comprises determining $$cv = (k_1 \& (m_{sum} << 1) + k_2 \& m_{sum}),$$

wherein cv is the correction value, $k_1$ and $k_2$ is set to a 0 or a 1 based on the type of block and the minimum of the width and the height of the block, & denotes a logical AND between the bit of the left operand and all bits of the right operand, and <<1 is a left shift by one step.

7 The method of any of Embodiment 3-6 wherein $k_1$ is set to a 0 responsive to a minimum of a width and a height of the block being filtered is greater than or equal to a first value and set to 1 responsive to the minimum of the width and the height of the block being filtered is less than the first value and $k_2$ is set to 1 responsive to one of the minimum of the width and the height of the block being filtered is greater than or equal to the first value or the block being an intra block and the minimum of the width and the height of the block being filtered is less than or equal to a second value that is smaller than the first value and is otherwise set to 0.

8. The method of any of Embodiments 3-7 wherein deriving the filtered sample comprises calculating $$I_F = I_C + (cv + 8) >> 4)$$

wherein $I_F$ is the filtered sample, $I_C$ is a sample being filtered, and cv is the correction value.

9. The method of any of Embodiments 3-7 wherein deriving the filtered sample comprises calculating $$I_F = I_C + (cv_{proto} + 16) >> 5)$$

wherein $I_F$ is the filtered sample, $I_C$ is the sample being filtered, and $cv_{proto}$ is the correction value.

10. The method of any of Embodiments 3-7 wherein deriving the filtered sample comprises calculating $$\Delta I_F = (cv_{proto} + 16) >> 5)$$

wherein $\Delta I_F$ is the filtered difference, and $cv_{proto}$ is the correction value.

11. The method of any of Embodiments 3-7, wherein deriving the filtered sample comprises:

receiving an indication of a filter strength used to encode the image; and calculating the filtered sample based on the indication of the filter strength.

12. The method of Embodiment 11 wherein receiving the indication of the filter strength comprises receiving a number of bits that define the filter strength.

13. The method of Embodiment 11 wherein calculating the filtered sample based on the indication of the filter strength comprises:

responsive to the indication indicating that a half strength filter strength was used to encode the image, calculating (901)

$$\Delta I_F = ((cv_{proto} + 32) >> 6),$$ wherein $\Delta I_F$ is the filtered difference, $cv_{proto}$ is the correction value, and >>6 is a right shift by 6 steps;

responsive to the indication indicating that a full strength filter strength was used to encode the image, calculating (903)

$$\Delta I_F = ((cv_{proto} + 16) >> 5),$$ wherein >>5 is a right shift by 5 steps;

responsive to the indication indicating that a double strength filter strength was used to encode the image, calculating (905)

$$\Delta I_F = ((cv_{proto} + 8) >> 4)$$ wherein >>4 is a right shift by 4 steps; and responsive to the indication indicating that a four times strength filter strength was used to encode the image, calculating (907)

$$\Delta I_F = ((cv_{proto} + 4) >> 3)$$ wherein >>3 is a right shift by 3 steps.

14. The method of Embodiment 11 wherein obtaining the modifier value comprises:

receiving a quantization parameter offset value; and obtaining the modifier value based on the quantization parameter offset value 15. The method of any of Embodiments 1-2 wherein determining the correction value comprises determining $$cv_{proto} = k_1 i \& (m_{sum} << a) + k_2 \& (m_{sum} << b),$$

wherein $cv_{proto}$ is the correction value, $k_1$ and $k_2$ is set to a 0 or a 1 based on the type of block and the minimum of the width and the height of the block, & denotes a logical AND between the bit of the left operand and all bits of the right operand, <<a is a left shift by a steps, and <<b is a left shift by b steps.

16. The method of Embodiment 15 wherein determining the correction values further comprises determining a and b from a look-up table.

17. The method of any of Embodiments 1-16 wherein $m_{sum}$ is a sum of modifier values $m_A$, $m_B$, $m_L$, $m_R$, $m_{NW}$, $m_{NE}$, $m_{SW}$, and $m_{se}$, wherein $m_A$ is a modifier value for a sample above $I_C$, $m_B$ is a modifier value for a sample below $I_C$, $m_L$ is a modifier value for a sample to a left of $I_C$, $m_R$ is a modifier value for a sample to a right of $I_C$, $m_{NW}$ is a modifier value for a sample one step up and left of $I_C$, $m_{NE}$ is a modifier value for a sample one set up and right of $I_C$, $m_{SW}$ is a modifier value for a sample one step below and left of $I_C$, and $m_{SE}$ is a modifier value for a sample one step below and right of $I_C$.

18. The method of Embodiment 17 further comprising:
responsive to the block being filtered being located at an edge of the image, determining which samples of the sample above $I_C$, the sample below $I_C$, the sample to the left of $I_C$, the sample to the right of $I_C$, the sample one step up and left of $I_C$, the sample one set up and right of $I_C$, the sample one step below and left of $I_C$, and the sample one step below and right of $I_C$ is a missing sample; and
for each missing sample:
setting a modifier value for the missing sample to a predetermined value of the modifier value of a sample located opposite the missing sample on the other side of the sample being filtered.

19. The method of any of Embodiments 3-18 wherein determining the correction value comprises:
calculating (601) $cv=(m_{sum})>>1$ for the sample being in an intra block and the minimum of the width and the height of the block being filtered is greater than or equal to a first value;
calculating (603) $cv=((m_{sum}<<1))>>1$ for the sample being in an intra block and the minimum of the width and the height of the block being filtered being lesser than the first value and greater than a second value;
calculating (605) $cv=((m_{sum}<<1)+m_{sum})>>1$ for the sample being in an intra block and the minimum of the width and the height of the block being filtered being lesser than or equal to the second value;
calculating (607) $cv=(m_{sum})>>1$ for the sample being in an inter block and the minimum of the width and the height of the block being filtered is greater than or equal to the first value;
calculating (609) $cv=((m_{sum}<<1))>>1$ for the sample being in an inter block and the minimum of the width and the height of the block being filtered being lesser than the first value and greater than the second value; and
calculating (611) $cv=((m_{sum}<<1))>>1$ for the sample being in an inter block and the minimum of the width and the height of the block being filtered being lesser than or equal to the second value,
wherein <<1 is a left shift by one step and >>1 is a right shift by one step.

20. The method of any of Embodiments 7-19 wherein the first value comprises 16 and the second value comprises 4.

21. The method of any of Embodiments 1-20 further comprising;
receiving, via a network interface (201), the image that has been encoded from an encoder via a network.

22. A decoder (107) configured to operate in a network, wherein the decoder is adapted to perform according to any of Embodiments 1-21.

23. A computer program comprising program code to be executed by processing circuitry (203) of a decoder (109) configured to operate in a network, whereby execution of the program code causes the decoder (109) to perform operations according to any of Embodiments 1-21.

24. A decoder apparatus (107) configured to operate in a network, the decoder apparatus comprising:
processing circuitry (203); and
memory (205) coupled with the processing circuitry, wherein the memory includes instructions that when executed by the processing circuitry causes the decoder apparatus to perform operations comprising:
decoding (501) all blocks of an image that has been encoded;
filtering at least one sample of at least one block of the image by, for each block being filtered:
for each sample being filtered of the at least one sample:
selecting (503) a plurality of neighboring samples of the sample being filtered;
for at least one neighboring sample of the plurality of neighboring samples:
calculating (505) a difference between said neighboring sample and said sample being filtered; and
obtaining (507) a modifier value based on said difference;
deriving (511) a modifier sum based on a sum of the modifier values for the plurality of neighboring samples;
determining (513) a correction value based on a conditional addition of at least one shifted version of the modifier sum, where each shift of the at least one shifted version has a same number of shift steps in each determination of the correction value; and
deriving (515) a filtered sample based on the sample to be filtered and the correction value; and
replacing (517) the sample being filtered with the filtered sample; and
outputting (521) the at least one block with the filtered sample towards an output of the decoder.

25. The decoder apparatus of Embodiment 24 wherein obtaining the modifier value comprises:
obtaining the modifier value from a lookup table.

26. The decoder apparatus of any of Embodiments 24-25 wherein determining the correction value comprises determining $$cv=(k_1*(m_{sum}<<1)+k_2*m_{sum})>>1,$$

wherein $k_1$ and $k_2$ is set to a 0 or a 1 based on the type of block and the minimum of the width and the height of the block, <<1 is a left shift by one step, and >>1 is a right shift by one step.

27. The decoder apparatus of any of Embodiments 24-25 wherein determining the correction value comprises determining $$cv_{proto}=(k_1*(m_{sum}<<1)+k_2*m_{sum}),$$

wherein $k_1$ and $k_2$ is set to a 0 or a 1 based on the type of block and the minimum of the width and the height of the block, <<1 is a left shift by one step.

28. The decoder apparatus of any of Embodiments 24-25 wherein determining the correction value comprises determining $$cv=(k_1 \& (m_{sum}<<1)+k_2 \& m_{sum})>>1,$$

wherein $k_1$ and $k_2$ is set to a 0 or a 1 based on the type of block and the minimum of the width and the height of the block, & denotes a logical AND between the bit of the left operand and all bits of the right operand, <<1 is a left shift by one step, and >>1 is a right shift by one step.

29. The decoder apparatus of any of Embodiments 24-25 wherein determining the correction value comprises determining $$cv_{proto}=(k_1 \& (m_{sum}<<1)+k_2 \& m_{sum}),$$

wherein $k_1$ and $k_2$ is set to a 0 or a 1 based on the type of block and the minimum of the width and the height of the block, & denotes a logical AND between the bit of the left operand and all bits of the right operand, and <<1 is a left shift by one step.

30. The decoder apparatus of any of Embodiments 26-29 wherein $k_1$ is set to 0 responsive to a minimum of a width and a height of the block being filtered is greater than or equal to a first value and set to 1 responsive to the minimum of the width and the height of the block being filtered is less than the first value and $k_2$ is set to 1 responsive to one of the minimum of the width and the height of the block being filtered is greater than or equal to the first value or the block being an intra block and the minimum of the width and the height of the block being filtered is less than or equal to a second value that is smaller than the first value and is otherwise set to 0.

31. The decoder apparatus of any of Embodiments 26-30 wherein deriving the filtered sample comprises calculating $$I_F=I_C+(cv+8)>>4)$$

wherein $I_F$ is the filtered sample, $I_C$ is the sample being filtered, and cv is the correction value.

32. The decoder apparatus of any of Embodiments 26-30 wherein deriving the filtered sample comprises calculating $$I_F=I_C+(cv_{proto}+16)>>5)$$

wherein $I_F$ is the filtered sample, $I_C$ is the sample being filtered, and $cv_{proto}$ is the correction value.

33. The decoder apparatus of any of Embodiments 26-30 wherein deriving the filtered sample comprises calculating $$\Delta I_F=(cv_{proto}+16)>>5)$$

wherein $I_F$ is the filtered difference and $cv_{proto}$ is the correction value.

34. The decoder apparatus of any of Embodiment 26-33 wherein $m_{sum}$ is a sum of modifier values $m_A$, $m_B$, $m_L$, $m_R$, $m_{NW}$, $m_{NE}$, $m_{SW}$, and $m_{SE}$, wherein $m_A$ is a modifier value for a sample above $I_C$, $m_B$ is a modifier value for a sample below $I_C$, $m_L$ is a modifier value for a sample to a left of $I_C$, $m_R$ is a modifier value for a sample to a right of $I_C$, $m_{NW}$ is a modifier value for a sample one step up and left of $I_C$, $m_{NE}$ is a modifier value for a sample one set up and right of $I_C$, $m_{SW}$ is a modifier value for a sample one step below and left of $I_C$, and $m_{SE}$ is a modifier value for a sample one step below and right of $I_C$.

35. The decoder apparatus of Embodiment 34 further comprising:
responsive to the sample being filtered being located at an edge of the image, determining which samples of the sample above $I_C$, the sample below $I_C$, the sample to the left of $I_C$, the sample to the right of $I_C$, the sample one step up and left of $I_C$, the sample one set up and right of $I_C$, the sample one step below and left of $I_C$, and the sample one step below and right of $I_C$ is a missing sample;
for each missing sample:
setting the modifier value for the missing sample to a scaled value of the modifier value of a sample located opposite the missing sample on the other side of the sample being filtered.

36. The decoder apparatus of any of Embodiments 24-34 wherein determining the correction value comprises:
calculating (601) $cv=(m_{sum})>>1$ for the sample being in an intra block and the minimum of the width and the height of the block being filtered is greater than or equal to a first value;
calculating (603) $cv=((m_{sum}<<1))>>1$ for the sample being in an intra block and the minimum of the width and the height of the block being filtered being lesser than the first value and greater than a second value;
calculating (605) $cv=((m_{sum}<<1)+m_{sum})>>1$ for the sample being in an intra block and the minimum of the width and the height of the block being filtered being lesser than or equal to the second value;
calculating (607) $cv=(m_{sum})>>1$ for the sample being in an inter block and the minimum of the width and the height of the block being filtered is greater than or equal to the first value;
calculating (609) $cv=((m_{sum}<<1))>>1$ for the sample being in an inter block and the minimum of the width and the height of the block being filtered being lesser than the first value and greater than the second value; and
calculating (611) $cv=((m_{sum}<<1))>>1$ for the sample being in an inter block and the minimum of the width and the height of the block being filtered being lesser than or equal to the second value,
wherein <<1 is a left shift by one step and >>1 is a right shift by one step.

37. The decoder apparatus of any of Embodiments 30-36 wherein the first value comprises 16 and the second value comprises 4.

38. The decoder apparatus of any of Embodiments 24-37 further comprising;
receiving, via a network interface (201), the image that has been encoded from an encoder via a network.

39. A method performed by a decoder comprising:
decoding (501) all blocks of an image that has been encoded;
filtering at least one sample of at least one block of the image by, for each block being filtered:
obtaining (601) a strength factor based on at least one of a type of the block being filtered and a size of the block being filtered;
for each sample being filtered of the at least one sample:
selecting (503) a plurality of neighboring samples of the sample being filtered;
for at least one neighboring sample of the plurality of neighboring samples:
calculating (505) a difference between the neighboring sample and the sample being filtered; and
obtaining (507) a modifier value based on the difference;
deriving (511) a modifier sum based on a sum of the modifier values for the plurality of neighboring samples;

determining (603) a correction value based on a multiplication using the strength factor and the modifier sum,
deriving (515) a filtered sample based on the sample to be filtered and the correction value; and
replacing (517) the sample being filtered with the filtered sample; and
outputting (521) the at least one block with the filtered sample towards an output of the decoder.

40. The method of Embodiment 39, wherein obtaining the modifier value comprises: obtaining the modifier value from a lookup table.

41. The method of any of Embodiments 39-40 wherein obtaining the strength factor based on at least one of the type of block being filtered and the size of the block being filtered comprises:
determining a minimum of a width and a height of the block being filtered;
determining the type of the block being filtered; and
selecting a strength factor based on the minimum of the width and the height and on the type of the block.

42. The method of any of Embodiments 39-41 wherein determining the correction value comprises determining $$cv = d_F * m_{sum}$$

wherein cv is the correction value, $d_F$ is the strength factor, and $m_{sum}$ is the modifier sum.

43. The method of any of Embodiments 39-42 wherein deriving the filtered sample comprises calculating $$I_F = I_C + (cv+8) >> 4)$$

wherein $I_F$ is the filtered sample, $I_C$ is the sample being filtered, and cv is the correction value.

44. The method of any of Embodiments 42-43 wherein $m_{sum}$ is a sum of modifier values $m_A$, $m_B$, $m_L$, $m_R$, $m_{NW}$, $m_{NE}$, $m_{SW}$, and $m_{SE}$, wherein $m_A$ is a modifier value for a sample above $I_C$, $m_B$ is a modifier value for a sample below $I_C$, $m_L$ is a modifier value for a sample to a left of $I_C$, $m_R$ is a modifier value for a sample to a right of $I_C$, $m_{NW}$ is a modifier value for a sample one step up and left of $I_C$, $m_{NE}$ is a modifier value for a sample one set up and right of $I_C$, $m_{SW}$ is a modifier value for a sample one step below and left of $I_C$, and $m_{SE}$ is a modifier value for a sample one step below and right of $I_C$.

45. The method of Embodiment 44 further comprising:
responsive to the block being filtered being located at an edge of the image, determining which samples of the sample above $I_C$, the sample below $I_C$, the sample to the left of $I_C$, the sample to the right of $I_C$, the sample one step up and left of $I_C$, the sample one set up and right of $I_C$, the sample one step below and left of $I_C$, and the sample one step below and right of $I_C$ is a missing sample; and
for each missing sample:
setting a modifier value for the missing sample to a predetermined value of the modifier value of a sample located opposite the missing sample on the other side of the sample being filtered.

46. The method of any of Embodiments 39-45 wherein determining the correction value comprises:
calculating (801) $cv=(1*m_{sum})>>1$ for the sample being in an intra block and the minimum of the width and the height of the block being filtered is greater than or equal to a first value;
calculating (803) $cv=(2*m_{sum})>>1$ for the sample being in an intra block and the minimum of the width and the height of the block being filtered being lesser than the first value and greater than a second value;
calculating (805) $cv=(3*m_{sum})>>1$ for the sample being in an intra block and the minimum of the width and the height of the block being filtered being lesser than or equal to the second value;
calculating (807) $cv=(1*m_{sum})>>1$ for the sample being in an inter block and the minimum of the width and the height of the block being filtered is greater than or equal to the first value;
calculating (809) $cv=(2*m_{sum})>>1$ for the sample being in an inter block and the minimum of the width and the height of the block being filtered being lesser than the first value and greater than the second value; and
calculating (811) $cv=(2*m_{sum})>>1$ for the sample being in an inter block and the minimum of the width and the height of the block being filtered being lesser than or equal to the second value,
wherein >>1 is a right shift by one step.

47. The method of Embodiment 46 wherein the first value comprises 16 and the second value comprises 4.

48. The method of any of Embodiments 39-47 further comprising;
receiving, via a network interface (201), the image that has been encoded from an encoder via a network.

49. A decoder (107) configured to operate in a network, wherein the decoder is adapted to perform according to any of Embodiments 39-48.

50. A computer program comprising program code to be executed by processing circuitry (203) of a decoder (109) configured to operate in a network, whereby execution of the program code causes the decoder (109) to perform operations according to any of Embodiments 39-48.

51. A decoder apparatus (107) configured to operate in a network, the decoder apparatus comprising:
processing circuitry (203); and
memory (205) coupled with the processing circuitry, wherein the memory includes instructions that when executed by the processing circuitry causes the decoder apparatus to perform operations comprising:
decoding (501) all blocks of an image that has been encoded;
filtering at least one sample of at least one block of the image by, for each block being filtered:
obtaining (601) a strength factor based on at least one of a type of the block being filtered and a size of the block being filtered;
for each sample being filtered of the at least one sample:
selecting (503) a plurality of neighboring samples of the sample being filtered;
for at least one neighboring sample of the plurality of neighboring samples:
calculating (505) a difference between the neighboring sample and the sample being filtered; and
obtaining (507) a modifier value based on the difference;
deriving (511) a modifier sum based on a sum of the modifier values for the plurality of neighboring samples;
determining (603) a correction value based on a multiplication using the strength factor and the modifier sum,
deriving (515) a filtered sample based on the sample to be filtered and the correction value; and replacing (517) the sample being filtered with the filtered sample; and outputting (521) the at least one block with the filtered sample towards an output of the decoder.

52. The decoder apparatus (107) of Embodiment 51, wherein obtaining the modifier value comprises:
obtaining the modifier value from a lookup table.

53. The decoder apparatus (107) of any of Embodiments 51-52 wherein obtaining the strength factor based on at least one of the type of block being filtered and the size of the block being filtered comprises:
determining a minimum of a width and a height of the block being filtered;
determining the type of the block being filtered; and
selecting a strength factor based on the minimum of the width and the height and on the type of the block.

54. The decoder apparatus (107) of any of Embodiments 51-52 wherein determining the correction value comprises determining $$cv = d_F * m_{sum}$$

wherein cv is the correction value, $d_F$ is the strength factor, and $m_{sum}$ is the modifier sum.

55. The decoder apparatus (107) of any of Embodiments 51-54 wherein deriving the filtered sample comprises calculating $$I_F = I_C + (cv+8) >> 4)$$

wherein $I_F$ is the filtered sample, $I_C$ is the sample being filtered, and cv is the correction value.

56. The decoder apparatus (107) of any of Embodiments 51-55 wherein $m_{sum}$ is a sum of modifier values $m_A$, $m_B$, $m_L$, $m_R$, $m_{NW}$, $m_{NE}$, $m_{SW}$, and $m_{SE}$, wherein $m_A$ is a modifier value for a sample above $I_C$, $m_B$ is a modifier value for a sample below $I_C$, $m_L$ is a modifier value for a sample to a left of $I_C$, $m_R$ is a modifier value for a sample to a right of $I_C$, $m_{NW}$ is a modifier value for a sample one step up and left of $I_C$, $m_{NE}$ is a modifier value for a sample one set up and right of $I_C$, $m_{SW}$ is a modifier value for a sample one step below and left of $I_C$, and $m_{SE}$ is a modifier value for a sample one step below and right of $I_C$.

57. The decoder apparatus (107) of Embodiment 56 further comprising:
responsive to the block being filtered being located at an edge of the image, determining which samples of the sample above $I_C$, the sample below $I_C$, the sample to the left of $I_C$, the sample to the right of $I_C$, the sample one step up and left of $I_C$, the sample one set up and right of $I_C$, the sample one step below and left of $I_C$, and the sample one step below and right of $I_C$ is a missing sample; and for each missing sample:
setting a modifier value for the missing sample to a predetermined value of the modifier value of a sample located opposite the missing sample on the other side of the sample being filtered.

58. The decoder apparatus (107) of any of Embodiments 51-57 wherein determining the correction value comprises:
calculating (801) $cv=(1*m_{sum})>>1$ for the sample being in an intra block and the minimum of the width and the height of the block being filtered is greater than or equal to a first value;
calculating (803) $cv=(2*m_{sum})>>1$ for the sample being in an intra block and the minimum of the width and the height of the block being filtered being lesser than the first value and greater than a second value;
calculating (805) $cv=(3*m_{sum})>>1$ for the sample being in an intra block and the minimum of the width and the height of the block being filtered being lesser than or equal to the second value;
calculating (807) $cv=(1*m_{sum})>>1$ for the sample being in an inter block and the minimum of the width and the height of the block being filtered is greater than or equal to the first value;
calculating (809) $cv=(2*m_{sum})>>1$ for the sample being in an inter block and the minimum of the width and the height of the block being filtered being lesser than the first value and greater than the second value; and
calculating (811) $cv=(2*m_{sum})>>1$ for the sample being in an inter block and the minimum of the width and the height of the block being filtered being lesser than or equal to the second value,
wherein >>1 is a right shift by one step.

59. The decoder apparatus (107) of Embodiment 58 wherein the first value comprises 16 and the second value comprises 4.

60. The decoder apparatus (107) of any of Embodiments 51-59 further comprising; receiving, via a network interface (201), the image that has been encoded from an encoder via a network.

Explanations are provided below for various abbreviations/acronyms used in the present disclosure.

ABBREVIATION EXPLANATION

AVC Advanced Video Coding
BD Bjontegaard Delta
CTU Coding Tree Unit
CU Coding Unit
DCT Discrete Cosine Transform
HD High Density
HEVC High Efficiency Video Coding
LUT Look-Up Table
SIMD single instruction multiple data
TU Transform Unit
VVC Versatile Video Coding
References are identified below.

[1] P. Wennersten, J. Ström, Y. Wang, K. Andersson, R. Sjöberg, J. Enhorn, "Bilateral Filtering for Video Coding", IEEE Visual Communications and Image Processing (VCIP), December 2017. [Paper downloadable from: http://www.jacobstrom.com/publications/Wennersten_et_al_VCIP2017.pdf]

[2] J. Ström, "Non-CE: Reduced complexity bilateral filter", JVET-M0885, 13th JVET Meeting, Marrakech, Marocco, 9-18 Jan. 2019. [Paper downloadable as a zip file from http://phenix.it-sudparis.eu/jvet/doc_end_user/documents/13_Marrakech/wg11/JVET-M0885-v4.zip]

[3] J. Ström, P. Wennersten, J. Enhorn, D. Liu, K. Andersson, R. Sjöberg, "CE2 related: Reduced complexity bilateral filter", JVET-K0274, 11th JVET Meeting, Ljubljana, Slovenia, 10-18 Jul. 2018. [Paper downloadable as a zip file from http://phenix.it-sudparis.eu/jvet/doc_end_user/documents/11_Liubliana/wg11/JVET-K0274-v5.zip]

[4] S. Ikonin, V. Stepin, J. Chen, "Non-CE: Hadamard transform domain filter", JVET-M0468, 13th JVET Meeting, Marrakech, Morocco, 9-18 Jan. 2019. [Paper downloadable as a zip file from http://phenix.it-sudparis.eu/jvet/doc_end_user/documents/13_Marrakech/wg11/JVET-M0468-v2.zip]

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a decoder, the method comprising:
    decoding all blocks of an image that has been encoded;
    after the decoding of all blocks of the image, filtering at least one sample of at least one block of the image by, for each block being filtered:
        for each sample being filtered of the at least one sample:
            selecting a plurality of neighboring samples of the sample being filtered;
            for at least one neighboring sample of the plurality of neighboring samples:
                calculating a difference between the neighboring sample and the sample being filtered; and
                obtaining a modifier value based on the difference;
            deriving a modifier sum based on a sum of the modifier values for the plurality of neighboring samples;
            determining a correction value based on one of
                a conditional addition of at least one shifted version of the modifier sum, where each shift of the at least one shifted version has a same number of shift steps in each determination of the correction value, and
                a multiplication using the modifier sum and a strength factor obtained based on at least one of a type of the block being filtered and a size of the block being filtered;
            deriving a filtered sample based on the sample to be filtered and the correction value; and
            storing the filtered sample; and
        outputting the at least one block with the filtered sample towards an output of the decoder.

2. The method of claim 1, wherein obtaining the modifier value comprises:
    obtaining the modifier value from a lookup table.

3. The method of claim 1 wherein the determining of the correction value based on a conditional addition comprises determining one of $$cv_{proto}=(k_1*(m_{sum}<<1)+k_2*m_{sum}), \text{ and}$$

$$cv_{proto}=(k_1\&(m_{sum}<<1)+k_2\&m_{sum}),$$

wherein $cv_{proto}$ is the correction value, $k_1$ and $k_2$ is set to a 0 or a 1 based on the type of block and the minimum of the width and the height of the block, & denotes a bit-wise AND between the bit of the left operand and each bit of the right operand, and <<1 is a left shift by one step.

4. The method of claim 3, wherein $k_1$ is set to a 0 responsive to a minimum of a width and a height of the block being filtered is greater than or equal to a first value and set to 1 responsive to the minimum of the width and the height of the block being filtered is less than the first value and $k_2$ is set to 1 responsive to one of the minimum of the width and the height of the block being filtered is greater than or equal to the first value or the block being an intra block and the minimum of the width and the height of the block being filtered is equal to a second value that is smaller than the first value and is otherwise set to 0.

5. The method of claim 4 wherein the first value comprises 16 and the second value comprises 4.

6. The method of claim 3 wherein $m_{sum}$ is a sum of modifier values $m_A$, $m_B$, $m_L$, $m_R$, $m_{NW}$, $m_{NE}$, $m_{SW}$, and $m_{SE}$, wherein $m_A$ is a modifier value for a sample above $I_C$, $m_B$ is a modifier value for a sample below $I_C$, $m_L$ is a modifier value for a sample to a left of $I_C$, $m_R$ is a modifier value for a sample to a right of $I_C$, $m_{NW}$ is a modifier value for a sample one step up and left of $I_C$, $m_{NE}$ is a modifier value for a sample one set up and right of $I_C$, $m_{SW}$ is a modifier value for a sample one step below and left of $I_C$, and $m_{SE}$ is a modifier value for a sample one step below and right of $I_C$.

7. The method of claim 6 further comprising:
    responsive to the block being filtered being located at an edge of the image, determining which samples of the sample above $I_C$, the sample below $I_C$, the sample to the left of $I_C$, the sample to the right of $I_C$, the sample one step up and left of $I_C$, the sample one set up and right of $I_C$, the sample one step below and left of $I_C$, and the sample one step below and right of $I_C$ is a missing sample; and
    for each missing sample:
        setting a modifier value for the missing sample to a predetermined value of the modifier value of a sample located opposite the missing sample on the other side of the sample being filtered.

8. The method of claim 1, wherein deriving the filtered sample comprises calculating $$I_F=I_C+(cv_{proto}+16)>>5)$$

wherein $I_F$ is the filtered sample, $I_C$ is the sample being filtered, and $cv_{proto}$ is the correction value.

9. The method of claim 1, wherein deriving the filtered sample comprises calculating $$\Delta I_F=(cv_{proto}+16)>>5)$$

wherein $\Delta I_F$ is the filtered difference, and $cv_{proto}$ is the correction value.

10. The method of claim 1, wherein deriving the filtered sample comprises:
   receiving an indication of a filter strength used to encode the image; and
   calculating the filtered sample based on the indication of the filter strength.

11. The method of claim 10 wherein receiving the indication of the filter strength comprises receiving a number of bits that define the filter strength.

12. The method of claim 10 wherein calculating the filtered sample based on the indication of the filter strength comprises:
   responsive to the indication indicating that a half strength filter strength was used to encode the image, calculating (901)

$\Delta I_F=((cv_{proto}+32)>>6)$, wherein $\Delta I_F$ is the filtered difference, $cv_{proto}$ is the correction value, and $>>6$ is a right shift by 6 steps;

responsive to the indication indicating that a full strength filter strength was used to encode the image, calculating (903)

$\Delta I_F=((cv_{proto}+16)>>5)$, wherein $>>5$ is a right shift by 5 steps;

responsive to the indication indicating that a double strength filter strength was used to encode the image, calculating (905)

$\Delta I_F=((cv_{proto}+8)>>4)$ wherein $>>4$ is a right shift by 4 steps; and responsive to the indication indicating that a four times strength filter strength was used to encode the image, calculating (907)

$\Delta I_F=((cv_{proto}+4)>>3)$ wherein $>>3$ is a right shift by 3 steps.

13. The method of claim 10 wherein obtaining the modifier value comprises:
   receiving a quantization parameter offset value; and
   obtaining the modifier value based on the quantization parameter offset value.

14. The method of claim 1, wherein obtaining the strength factor based on at least one of the type of block being filtered and the size of the block being filtered comprises:
   determining a minimum of a width and a height of the block being filtered;
   determining the type of the block being filtered; and
   selecting a strength factor based on the minimum of the width and the height and on the type of the block being filtered.

15. The method of claim 1, wherein the determining of a correction value based upon a multiplication comprises determining $cv_{proto}=d_F*m_{sum}$ wherein $cv_{proto}$ is the correction value, $d_F$ is the strength factor, and $m_{sum}$ is the modifier sum.

16. A decoder apparatus, the decoder apparatus comprising:
   processing circuitry; and
   memory coupled with the processing circuitry, wherein the memory includes instructions that when executed by the processing circuitry causes the decoder apparatus to perform operations comprising:
   decoding all blocks of an image that has been encoded;
   after the decoding of all blocks of the image, filtering at least one sample of at least one block of the image by, for each block being filtered:
      for each sample being filtered of the at least one sample:
         selecting a plurality of neighboring samples of the sample being filtered;
         for at least one neighboring sample of the plurality of neighboring samples:
            calculating a difference between the neighboring sample and the sample being filtered; and
            obtaining a modifier value based on the difference;
         deriving a modifier sum based on a sum of the modifier values for the plurality of neighboring samples;
         determining a correction value based on one of
            a conditional addition of at least one shifted version of the modifier sum, where each shift of the at least one shifted version has a same number of shift steps in each determination of the correction value, and
            a multiplication using the modifier sum and a strength factor obtained based on at least one of a type of the block being filtered and a size of the block being filtered;
         deriving a filtered sample based on the sample to be filtered and the correction value; and
         storing the filtered sample; and
      outputting the at least one block with the filtered sample towards an output of the decoder.

17. A computer program product, comprising a non-transitory computer-readable medium having stored therein program code to be executed by processing circuitry of a decoder, whereby execution of the program code causes the decoder to perform operations comprising:
   decoding all blocks of an image that has been encoded;
   after the decoding of all blocks of the image, filtering at least one sample of at least one block of the image by, for each block being filtered:
      for each sample being filtered of the at least one sample:
         selecting a plurality of neighboring samples of the sample being filtered;
         for at least one neighboring sample of the plurality of neighboring samples:
            calculating a difference between the neighboring sample and the sample being filtered; and
            obtaining a modifier value based on the difference;
         deriving a modifier sum based on a sum of the modifier values for the plurality of neighboring samples;
         determining a correction value based on one of
            a conditional addition of at least one shifted version of the modifier sum, where each shift of the at least one shifted version has a same number of shift steps in each determination of the correction value, and
            a multiplication using the modifier sum and a strength factor obtained based on at least one of a type of the block being filtered and a size of the block being filtered;
         deriving a filtered sample based on the sample to be filtered and the correction value; and replacing the sample being filtered with the filtered sample; and outputting the at least one block with the filtered sample towards an output of the decoder.

* * * * *